Figure 1:
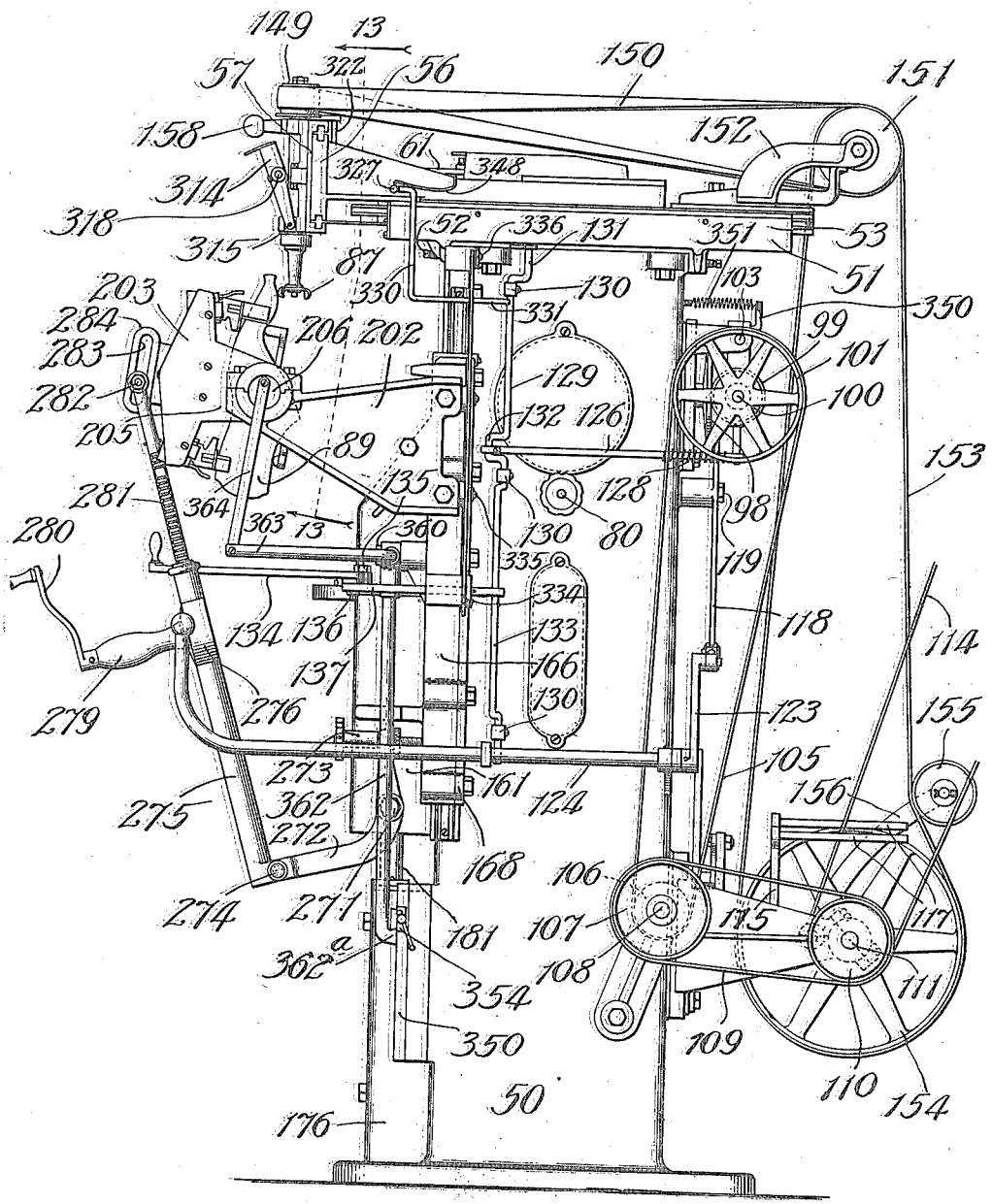

A. B. NORRIS.
WOODWORKING MACHINE.
APPLICATION FILED JULY 17, 1914.

1,196,716.

Patented Aug. 29, 1916.
18 SHEETS—SHEET 1.

Witnesses:

Inventor:
Arthur B. Norris,
By Danforth, Lee, Chittenden & Weber,
Attys.

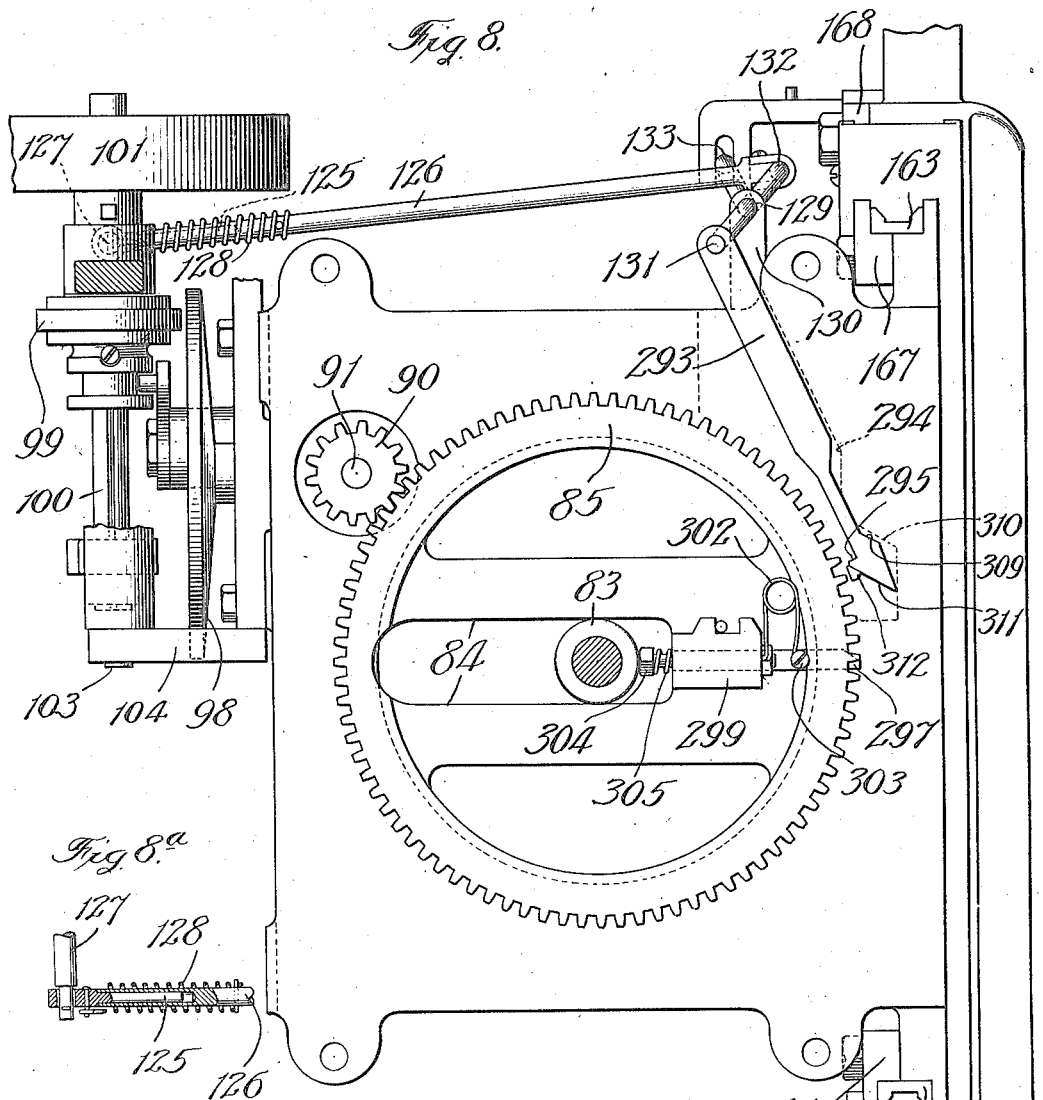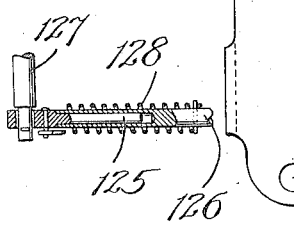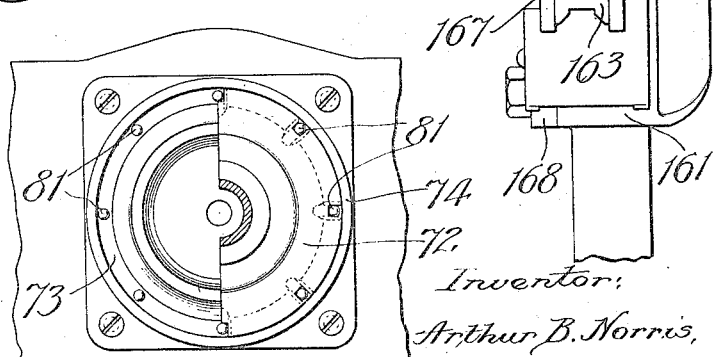

A. B. NORRIS.
WOODWORKING MACHINE.
APPLICATION FILED JULY 17, 1914.

1,196,716.

Patented Aug. 29, 1916.
18 SHEETS—SHEET 8.

Witnesses:
Inventor:
Arthur B. Norris,
By Dyrenforth, Lee, Chritton & Wiles,
Attys.

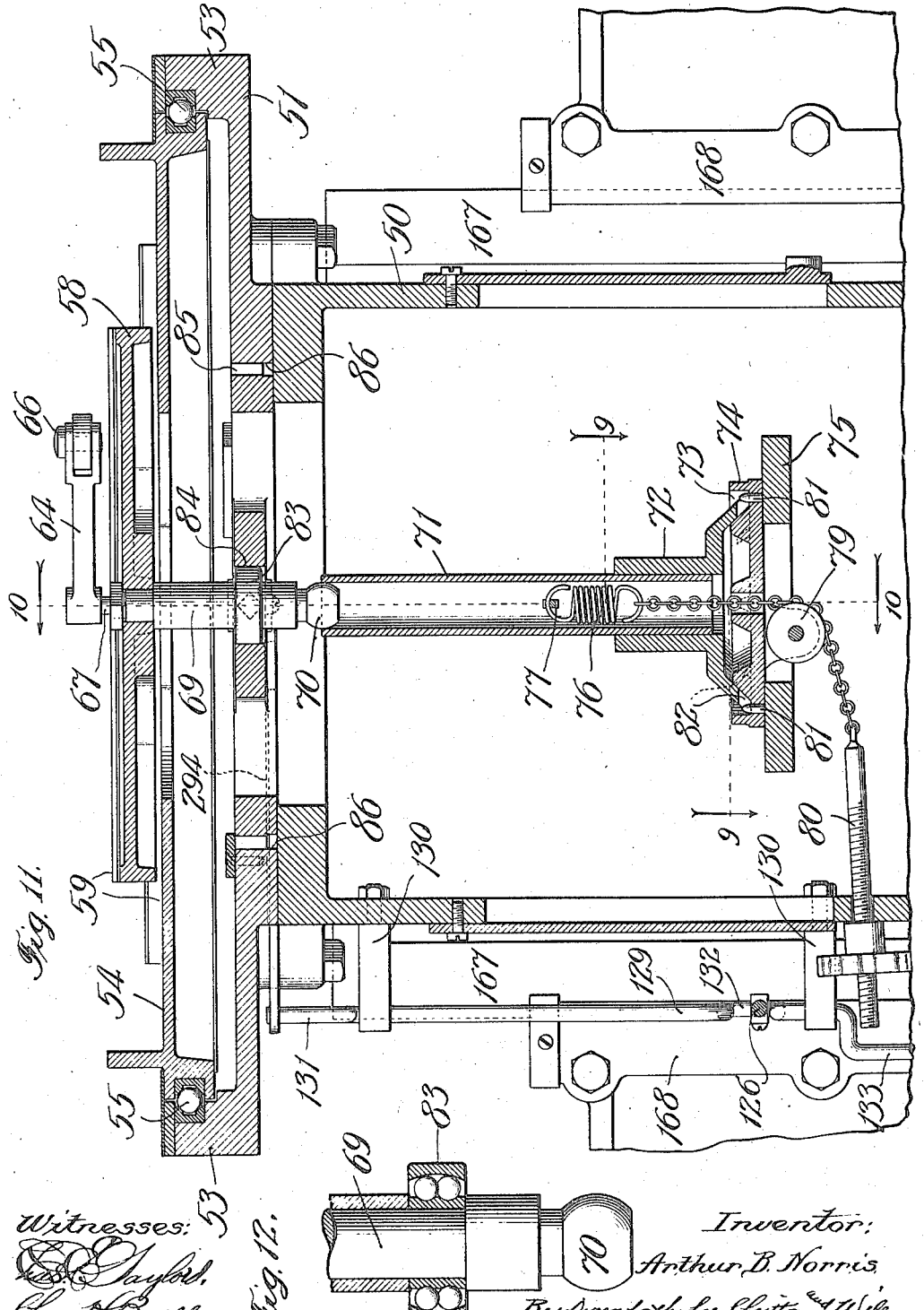

A. B. NORRIS.
WOODWORKING MACHINE.
APPLICATION FILED JULY 17, 1914.

1,196,716.

Patented Aug. 29, 1916.
18 SHEETS—SHEET 10.

Witnesses:
Inventor:
Arthur B. Norris,
By Dyrenforth, Lee, Chritton and Wiles,
Attys.

A. B. NORRIS.
WOODWORKING MACHINE.
APPLICATION FILED JULY 17, 1914.
1,196,716.
Patented Aug. 29, 1916.
18 SHEETS—SHEET 11.
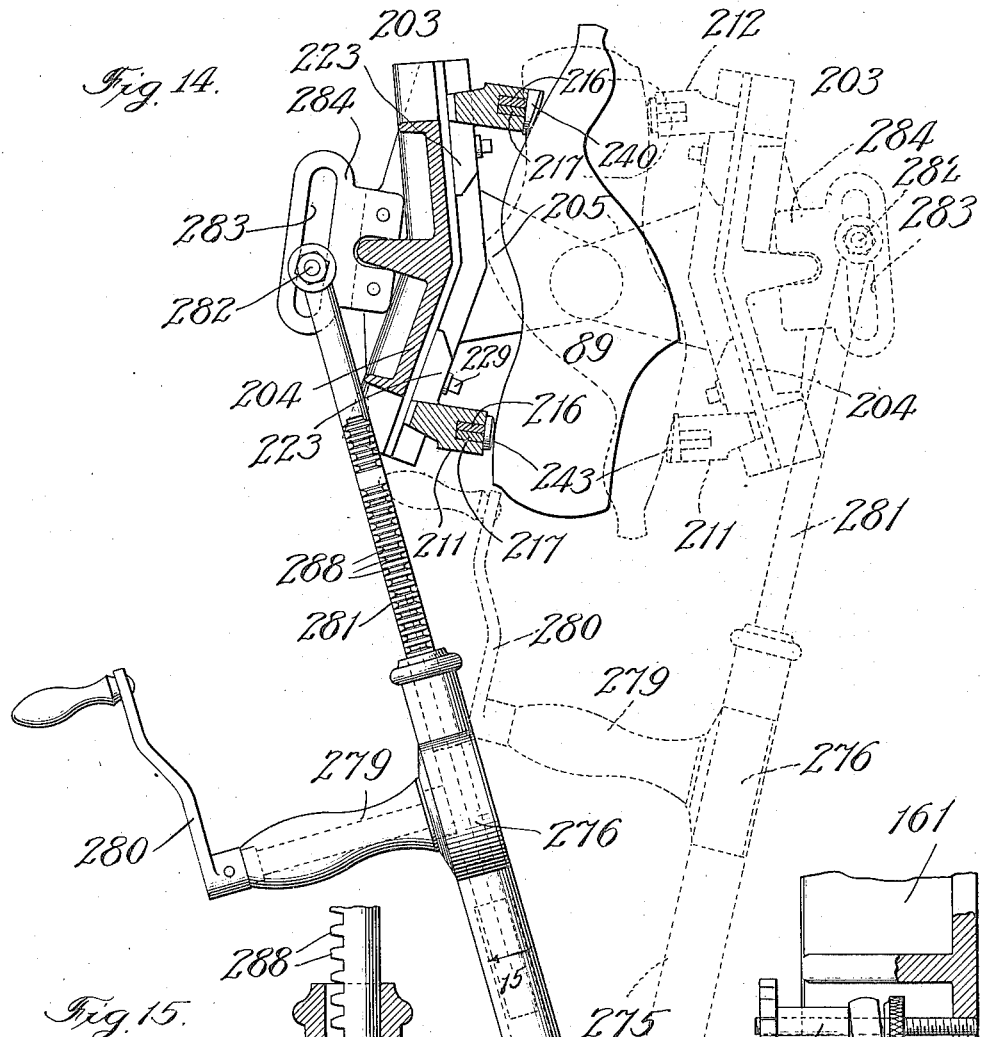
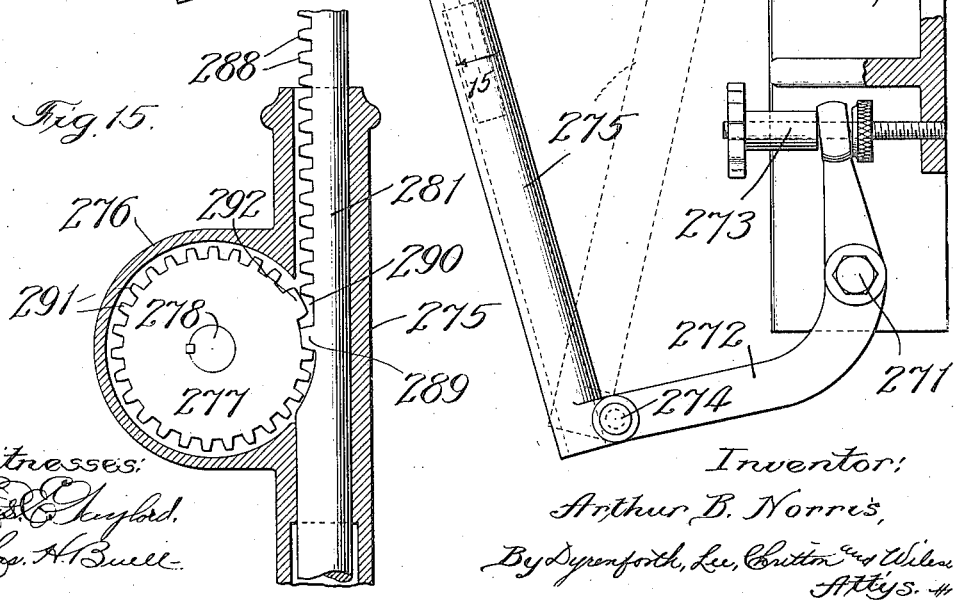
Inventor:
Arthur B. Norris,

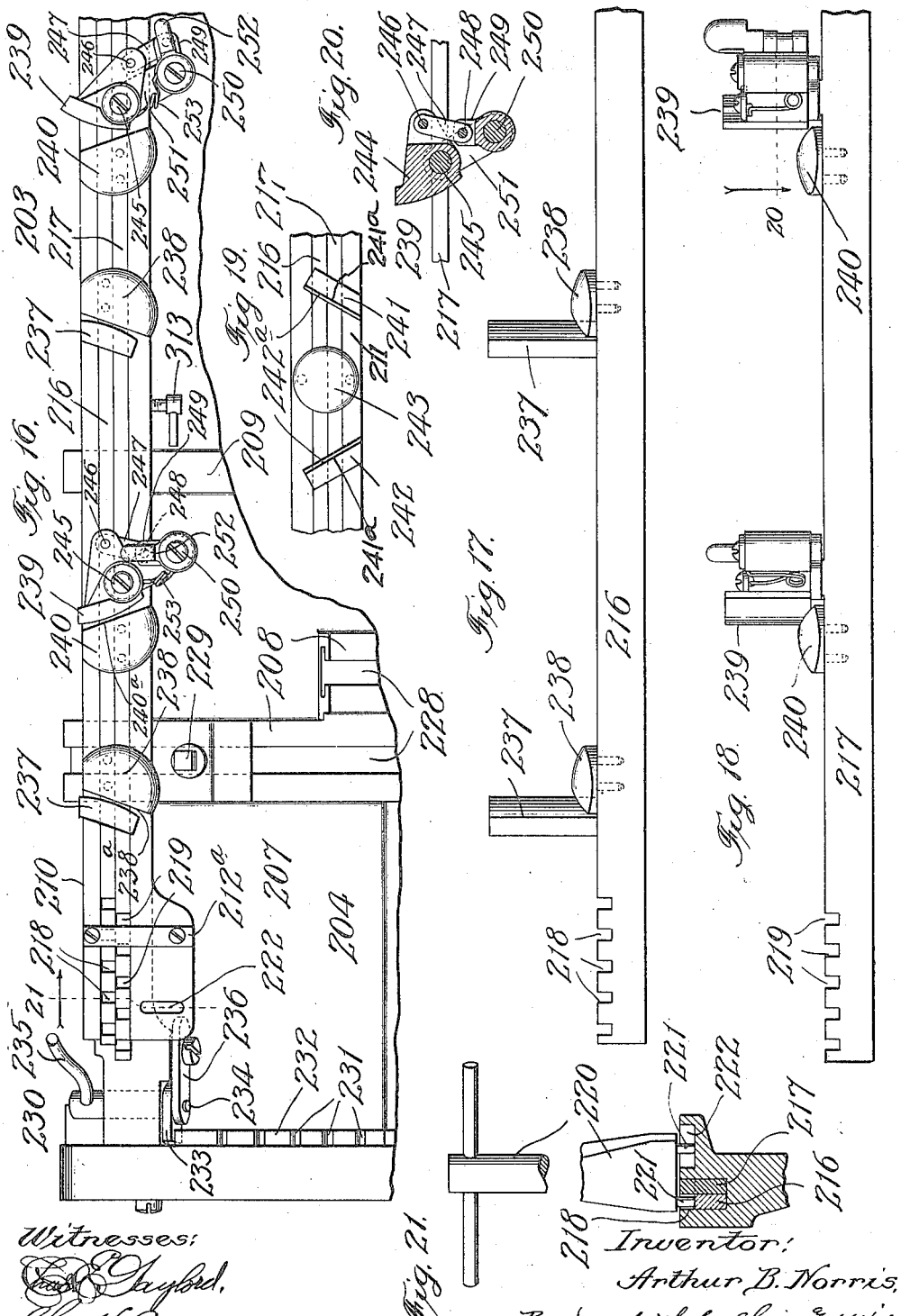

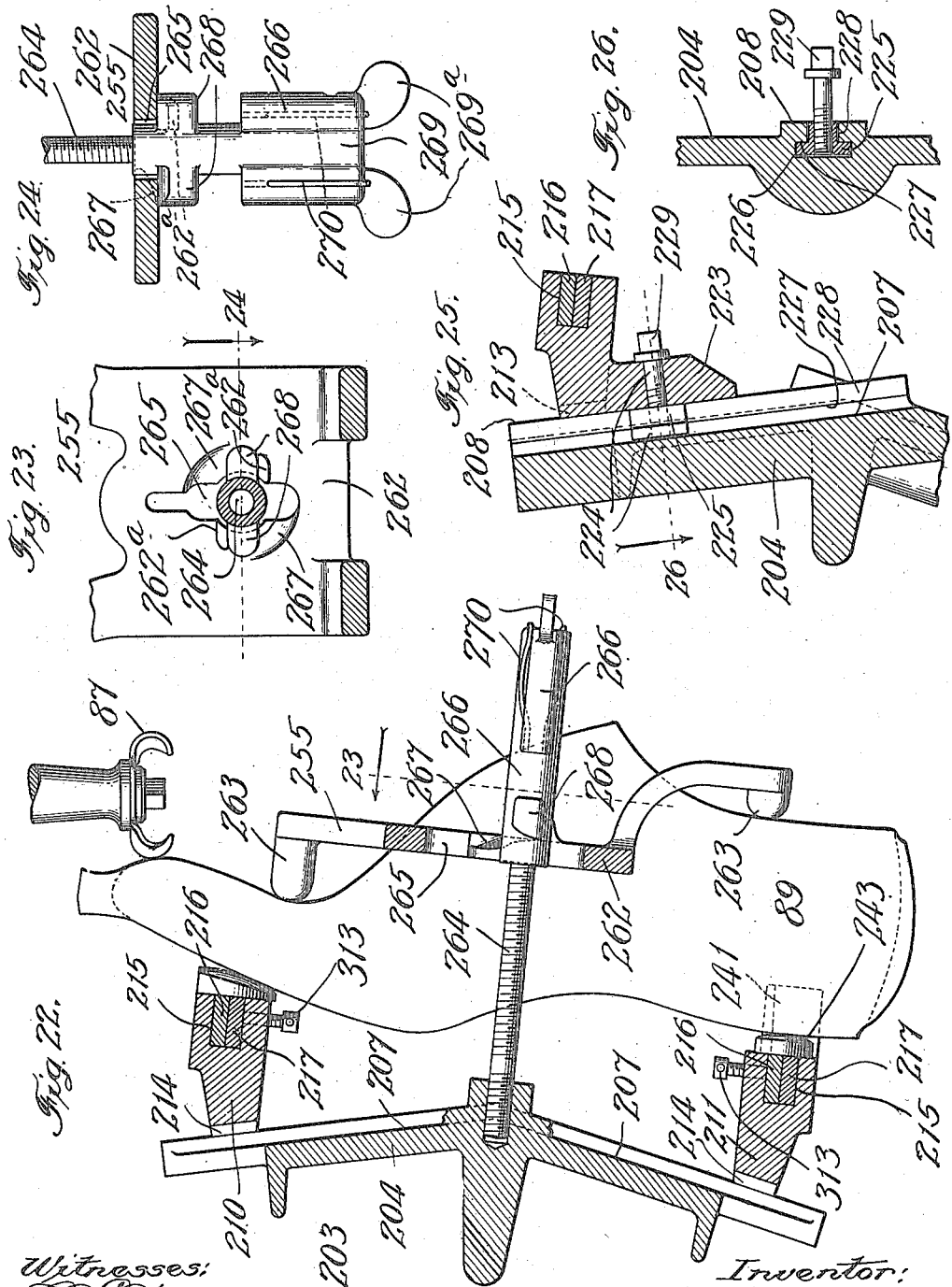

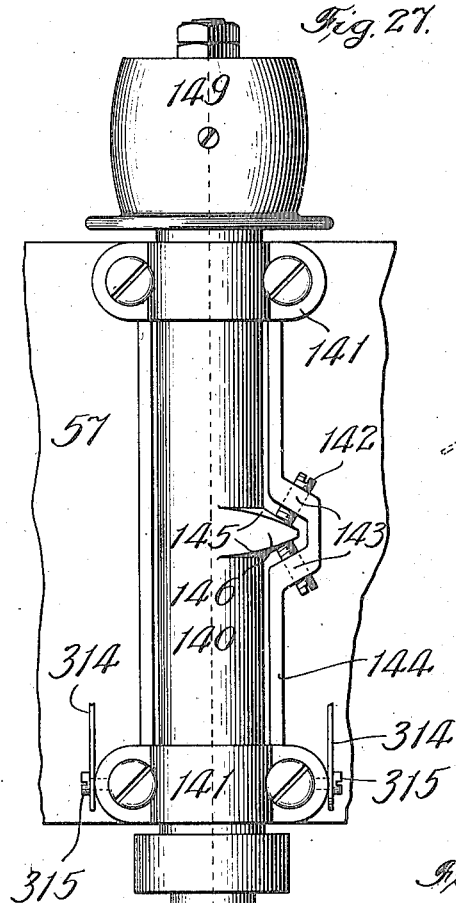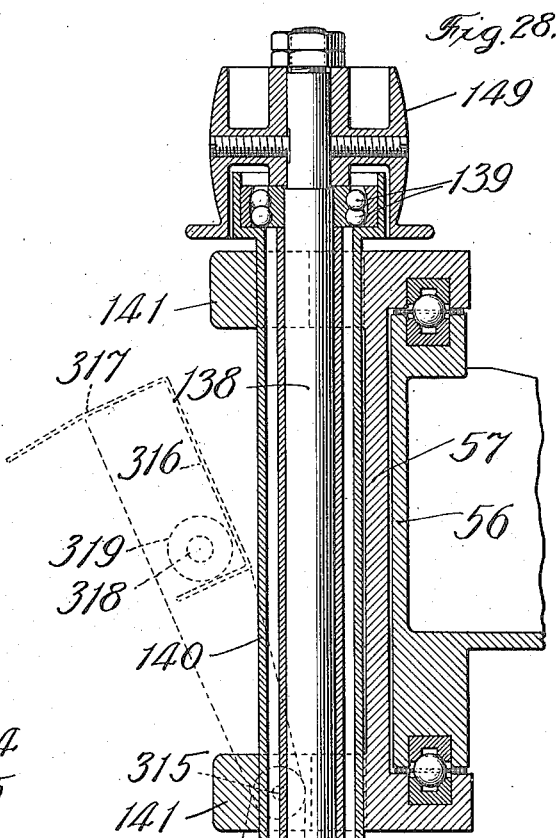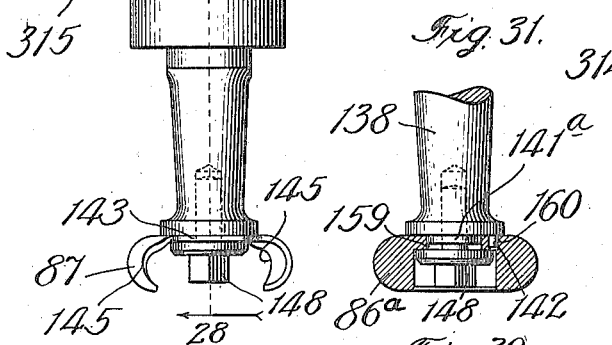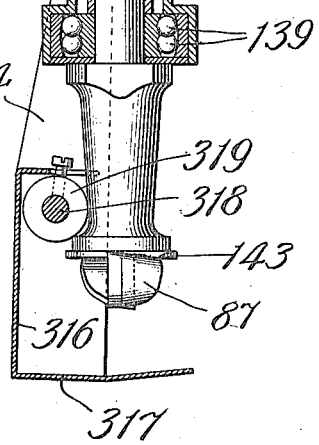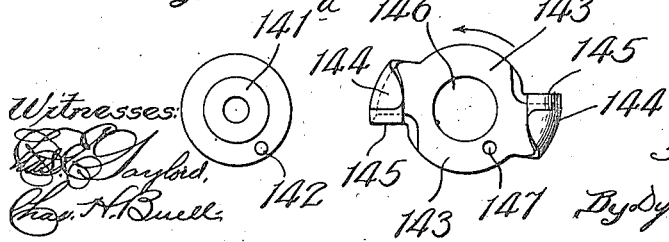

A. B. NORRIS.
WOODWORKING MACHINE.
APPLICATION FILED JULY 17, 1914.

1,196,716.

Patented Aug. 29, 1916.
18 SHEETS—SHEET 15.

Inventor:
Arthur B. Norris,
By Dyrenforth, Lee, Chritton & Wiles
Attys.

A. B. NORRIS.
WOODWORKING MACHINE.
APPLICATION FILED JULY 17, 1914.
1,196,716.
Patented Aug. 29, 1916.
18 SHEETS—SHEET 16.
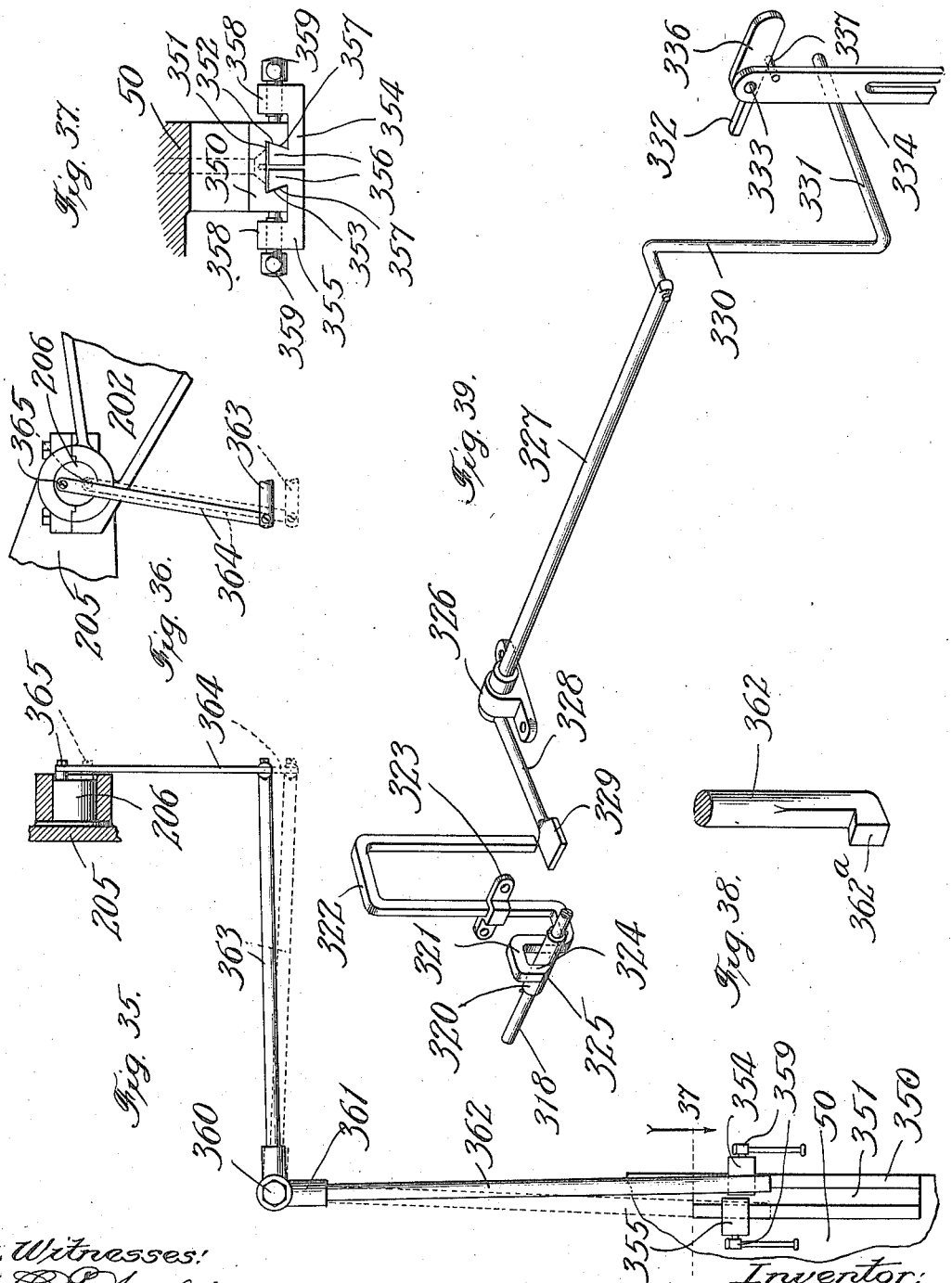

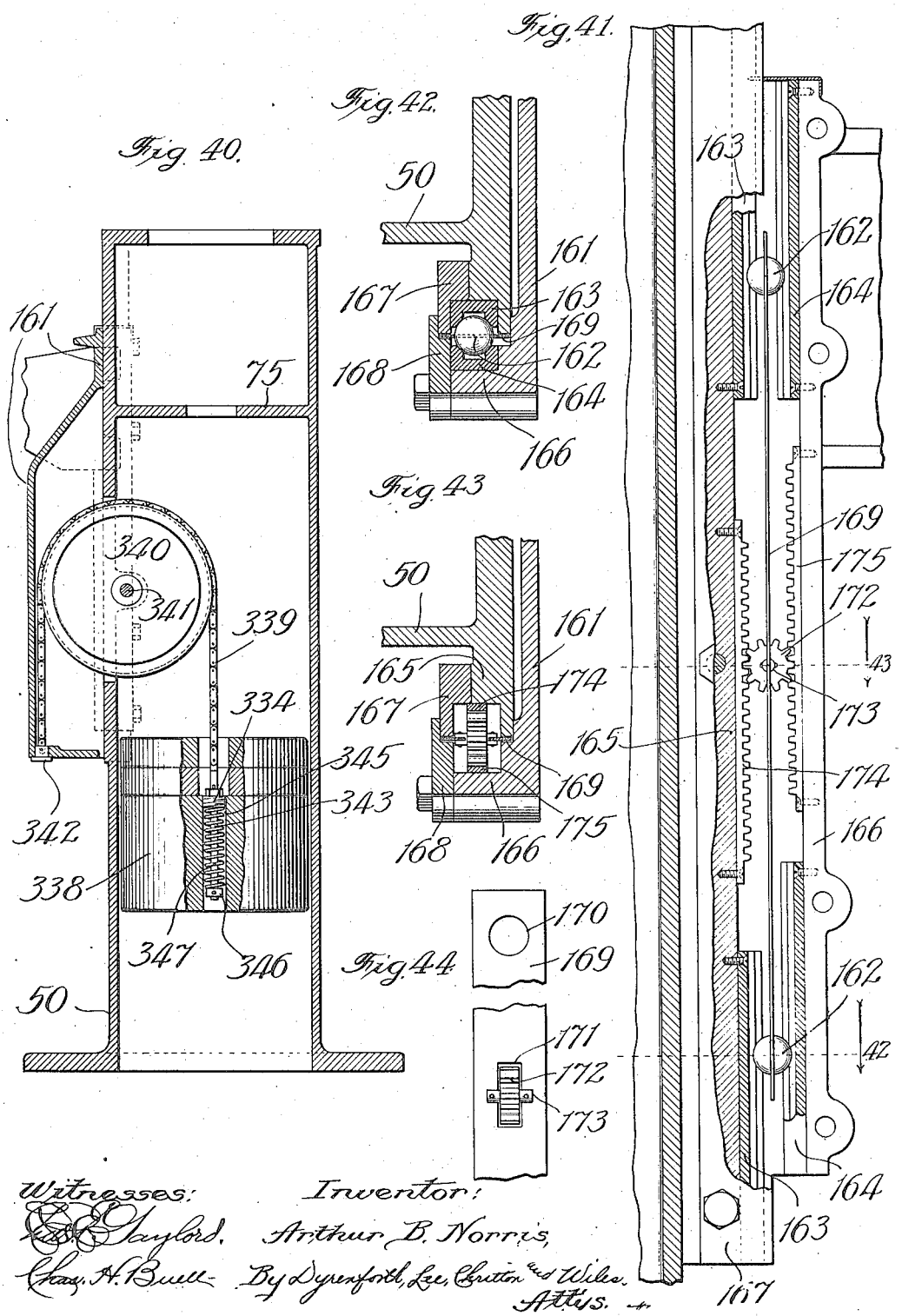

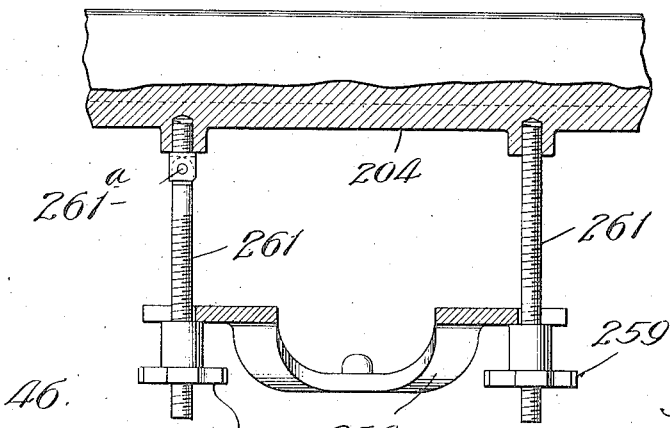
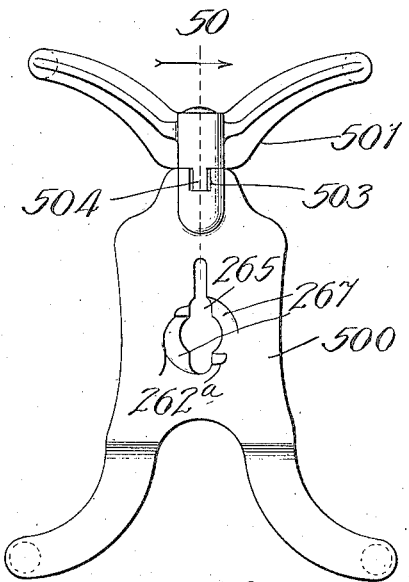
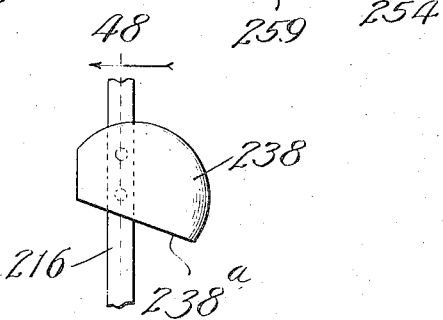
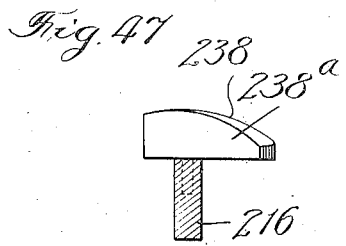
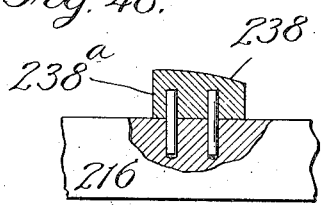
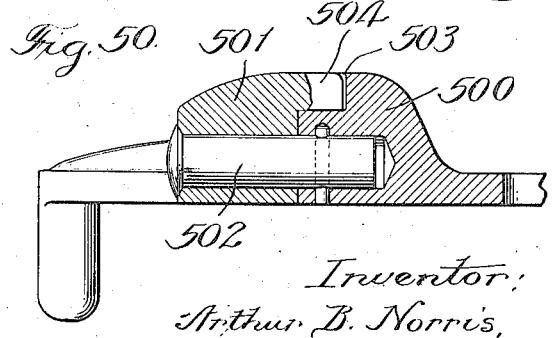

UNITED STATES PATENT OFFICE.

ARTHUR B. NORRIS, OF ROCHESTER, NEW YORK, ASSIGNOR TO CHARLES E. REED & CO., OF CHICAGO, ILLINOIS, A CORPORATION OF ILLINOIS.

WOODWORKING-MACHINE.

1,196,716.     Specification of Letters Patent.   Patented Aug. 29, 1916.

Application filed July 17, 1914. Serial No. 851,595.

*To all whom it may concern:*

Be it known that I, ARTHUR B. NORRIS, a citizen of the United States, residing at Rochester, in the county of Monroe and State of New York, have invented a new and useful Improvement in Woodworking-Machines, of which the following is a specification.

My invention relates, more particularly, to woodworking machines for removing the stubs which remain on the toe and heel portions of wood-lasts after they have been turned on a lathe, or otherwise formed, and shaping the ends of the lasts to cause them to present the desired form.

The type of machine to which my invention relates is that involving a rotary cutter for operating on the lasts, guided in its cutting movements by operative connections between it and a tracer-element adapted to be revolved about the end of a pattern, or form, the contour of which corresponds to the contour it is desired the lasts should present, and a work-support adapted to support the work to be operated on and movable relative to the cutters for feeding the work to the latter as the cutting operation progresses.

My objects, generally stated, are to generally improve upon machines of this type as hitherto constructed so as to cause them to better perform the work for which they are provided.

Specifically stated, my primary objects are to provide improved work-holding devices which shall be adjustable for reversing the ends of the work to permit the cutters to operate on both ends of the lasts without readjusting the work on the holder, adjustable for varying the throw of the holder in reversing it, and adjustable for work of different sizes; to provide improved means for reversing the work-holder and releasably locking it in position; to provide improved bearings for the carriage supporting the work-holder; to provide adjustable stop-devices for limiting the upward movement of the work-holder carriage in repositioning it after completing the cutting operation on the work while the holder is in one position, which may be adjusted to cause the carriage to be automatically arrested, when lifted, at different heights, depending on the axial position of the work-holder; to provide automatically-operating means for disconnecting the driving means controlling the rotary movement of the cutters about the work; to provide improved means controlling the descent of the work-holder-carriage; to provide a hand-feed for the work-holder-carriage; to provide improved clamping means for securing the work against movement on the work-holder; to provide for the adjustment of the cutter and pattern-tracer spindles; to provide guard-means for protecting the operator from injury by the cutter-blades in operating the machine, and automatically operating means for moving the guards to operative position; and to provide improved means for cushioning the counterweight controlling the work-holding-carriage in its movement.

Figure 2:
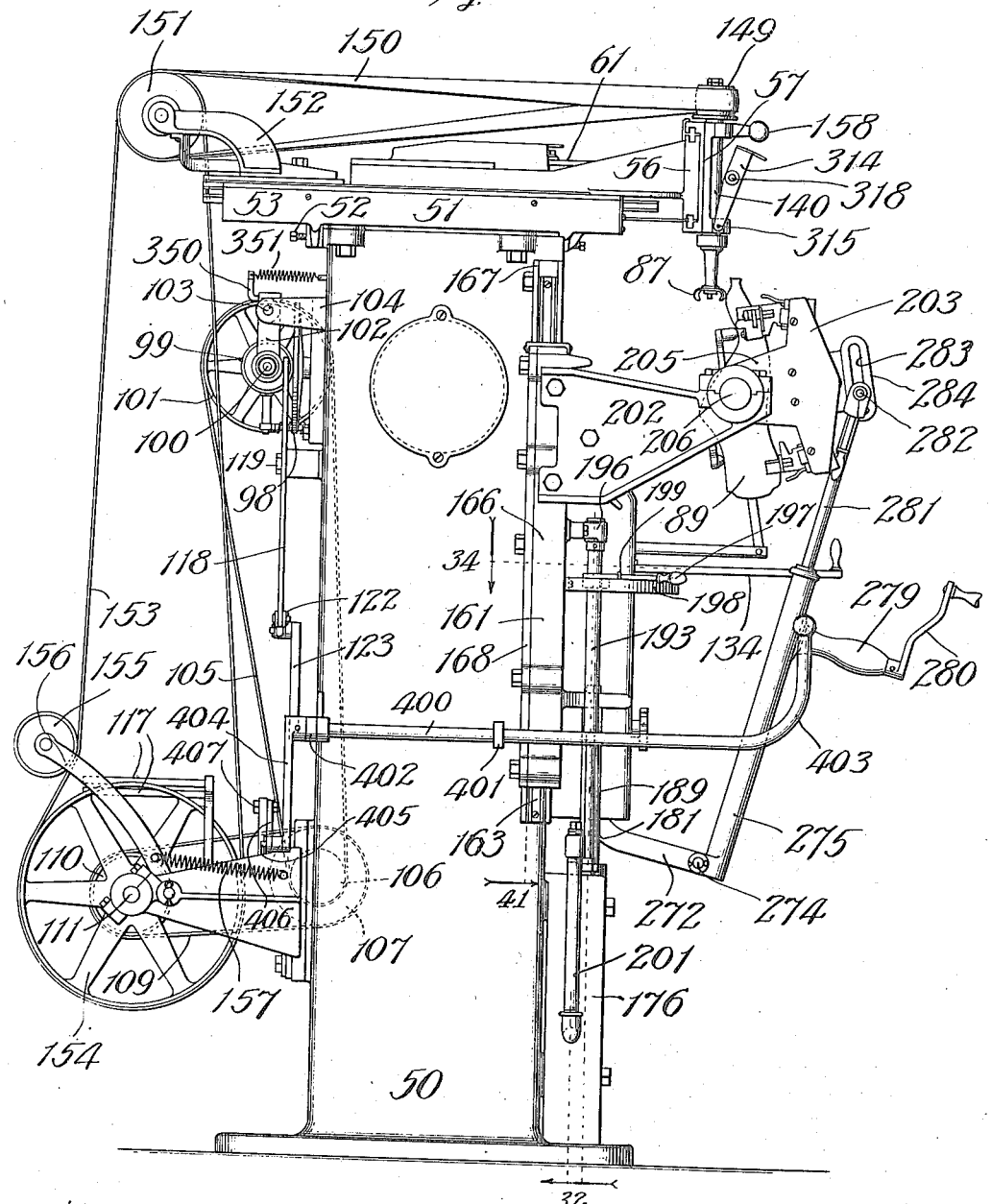
Figure 3:
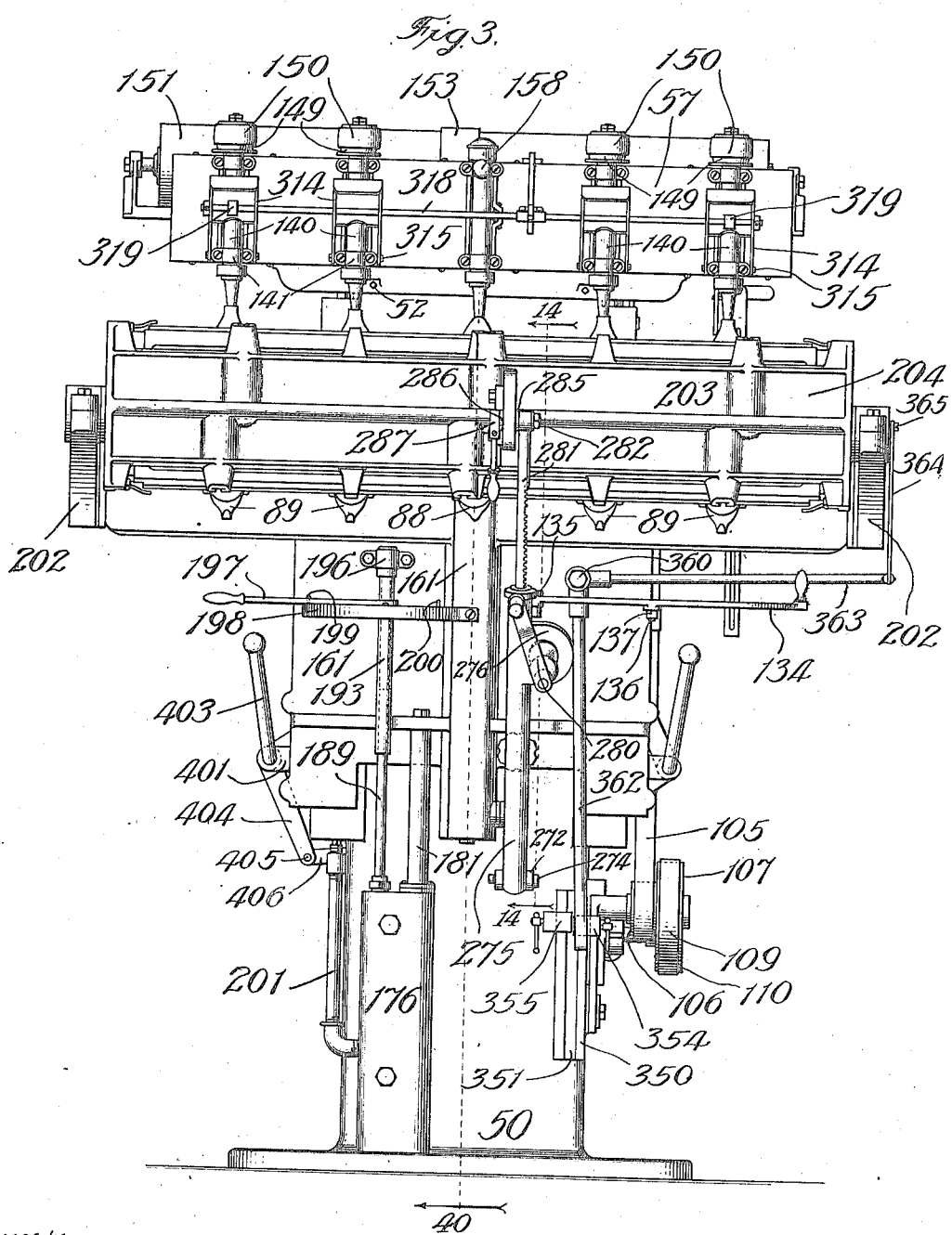
Figure 4:
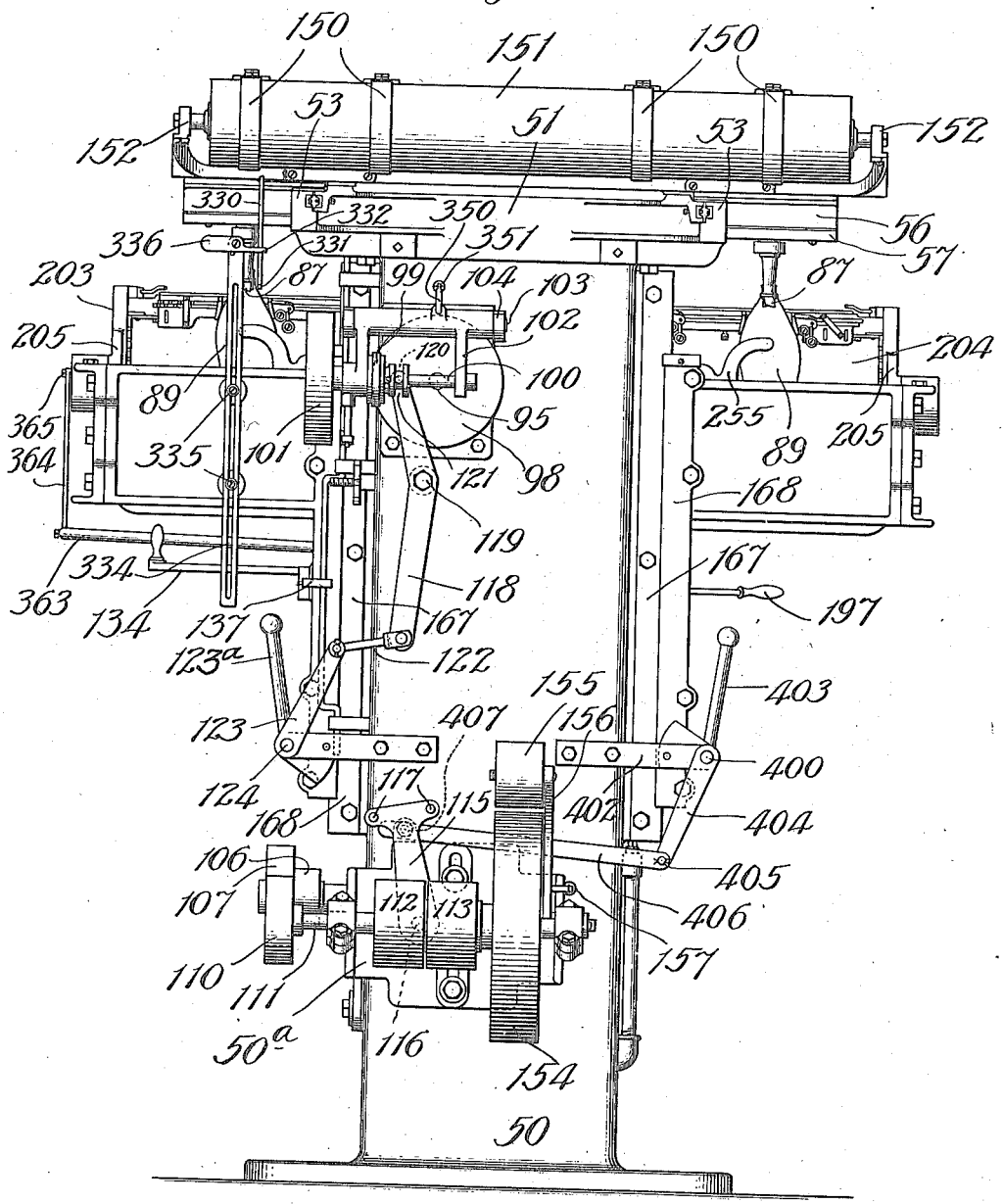
Figure 5:
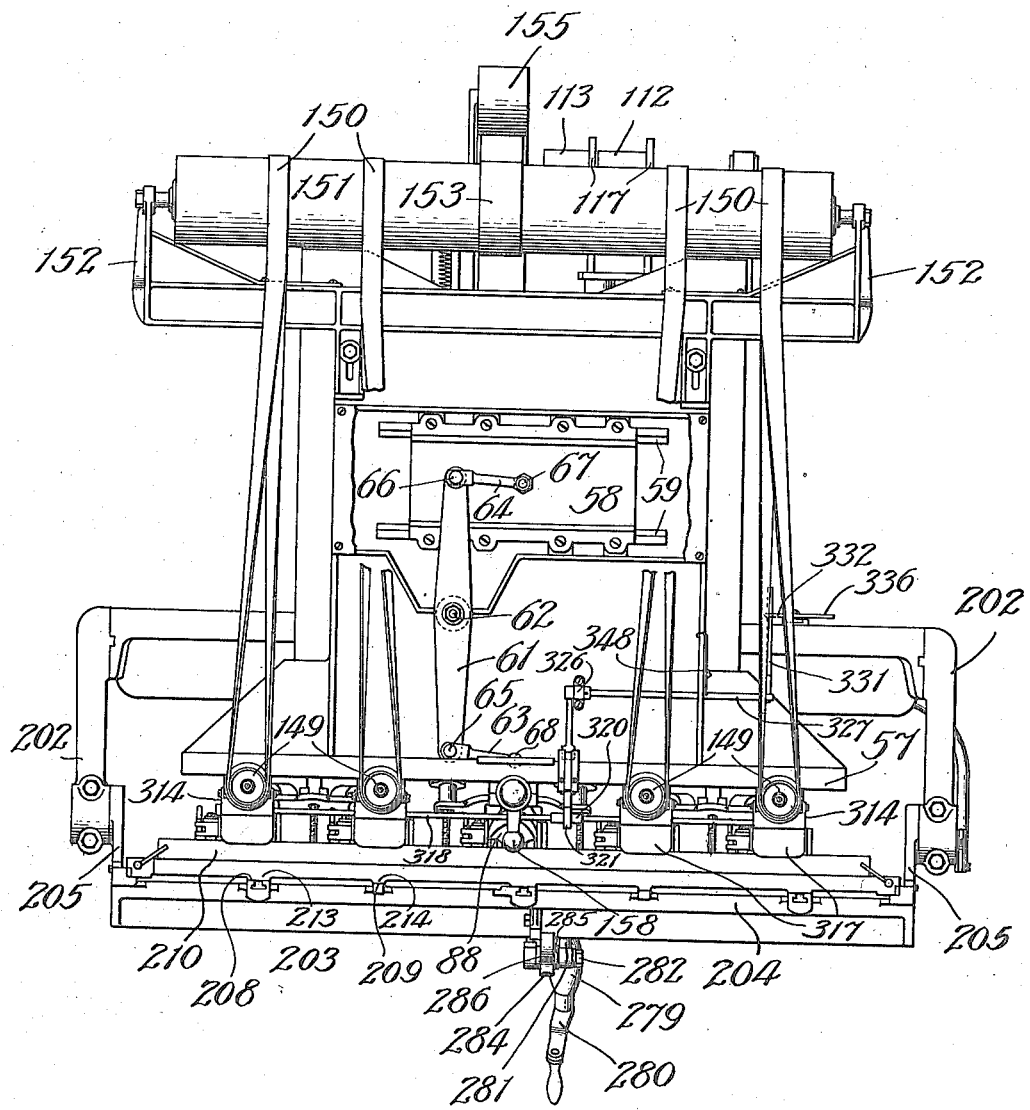
Figure 6:
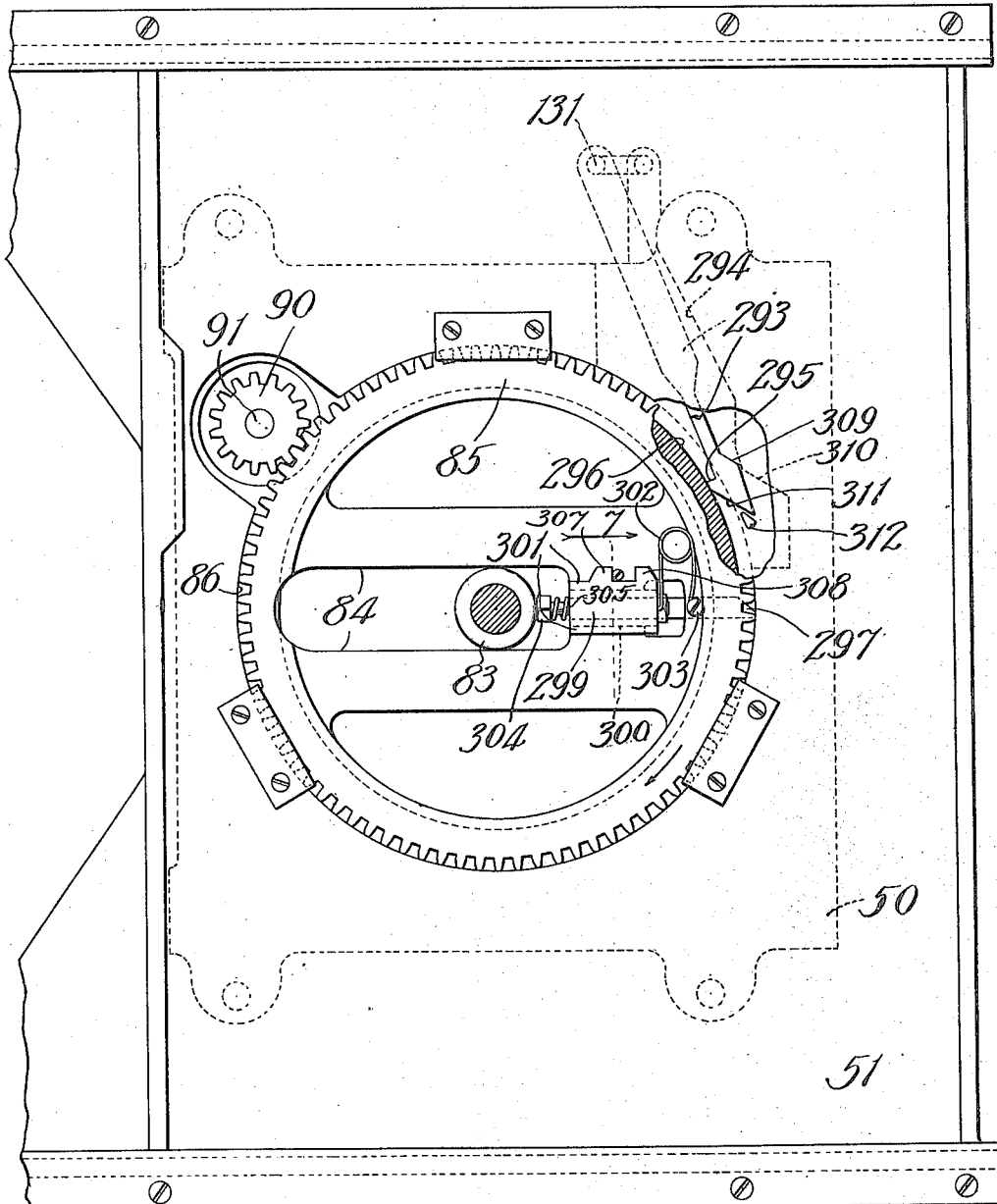
Figure 7:
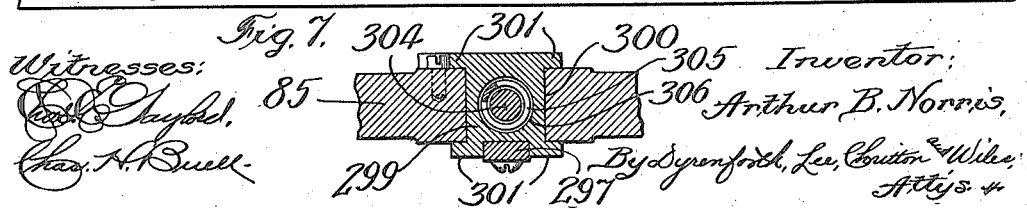
Figure 10:
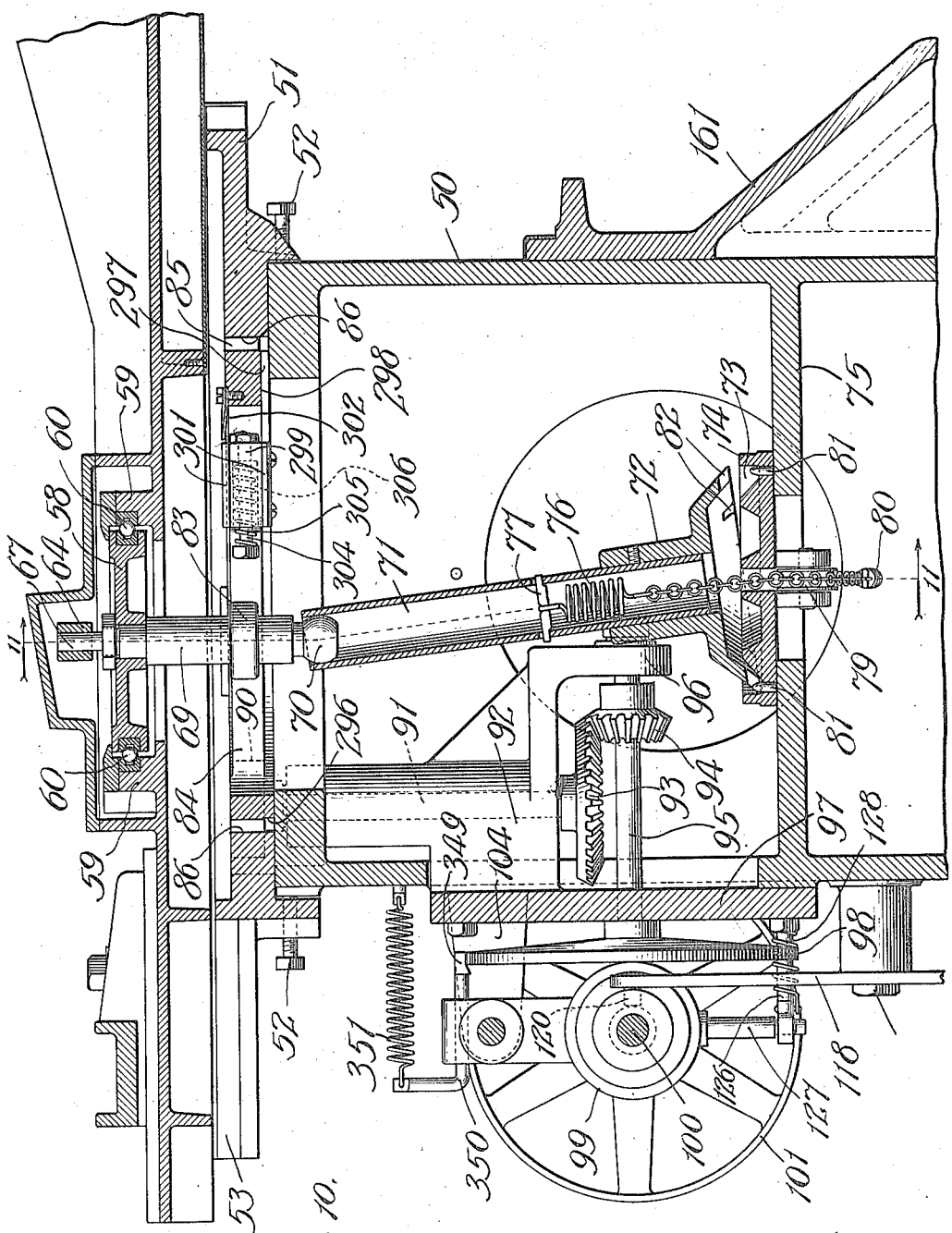
Figure 13:
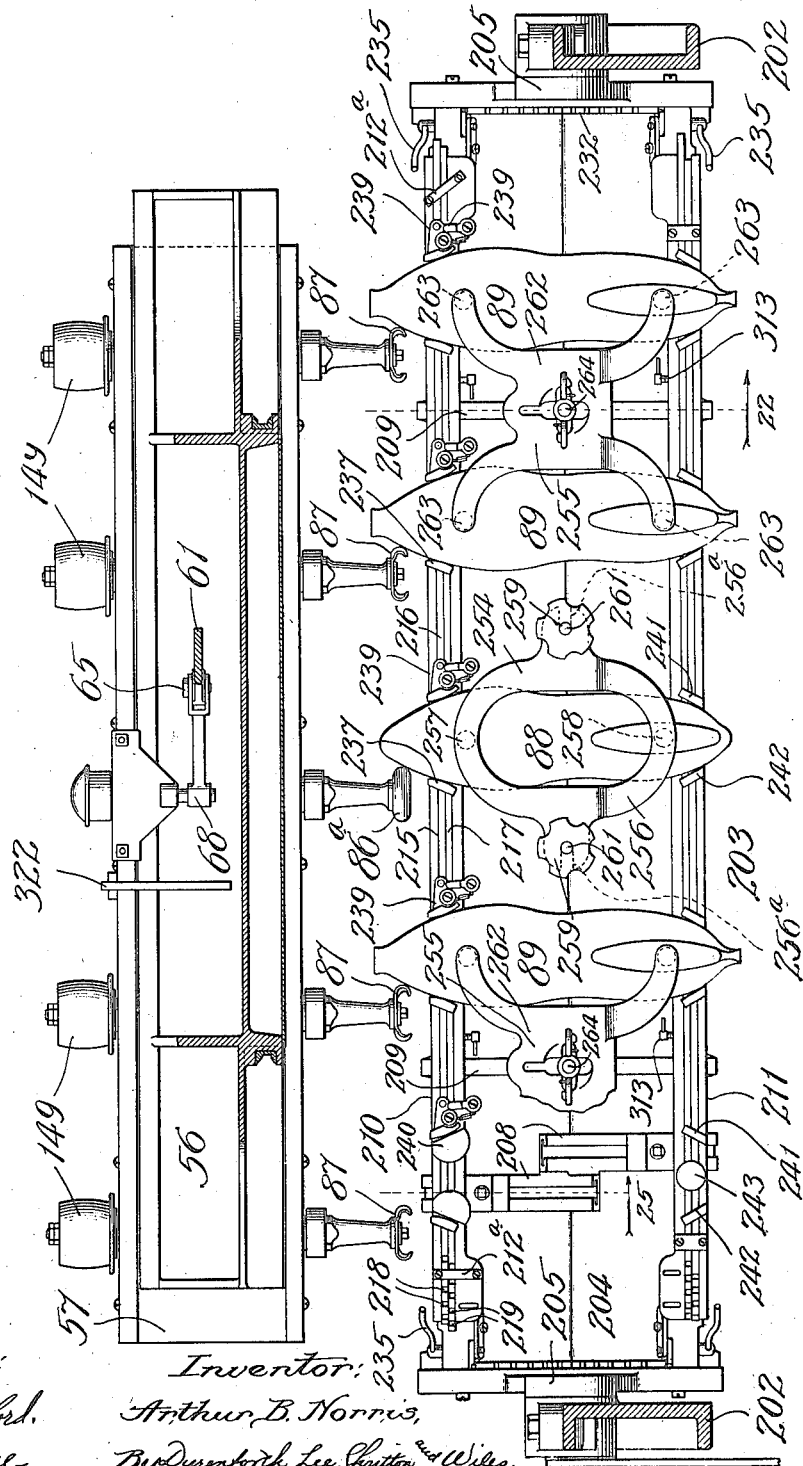
Figure 32:
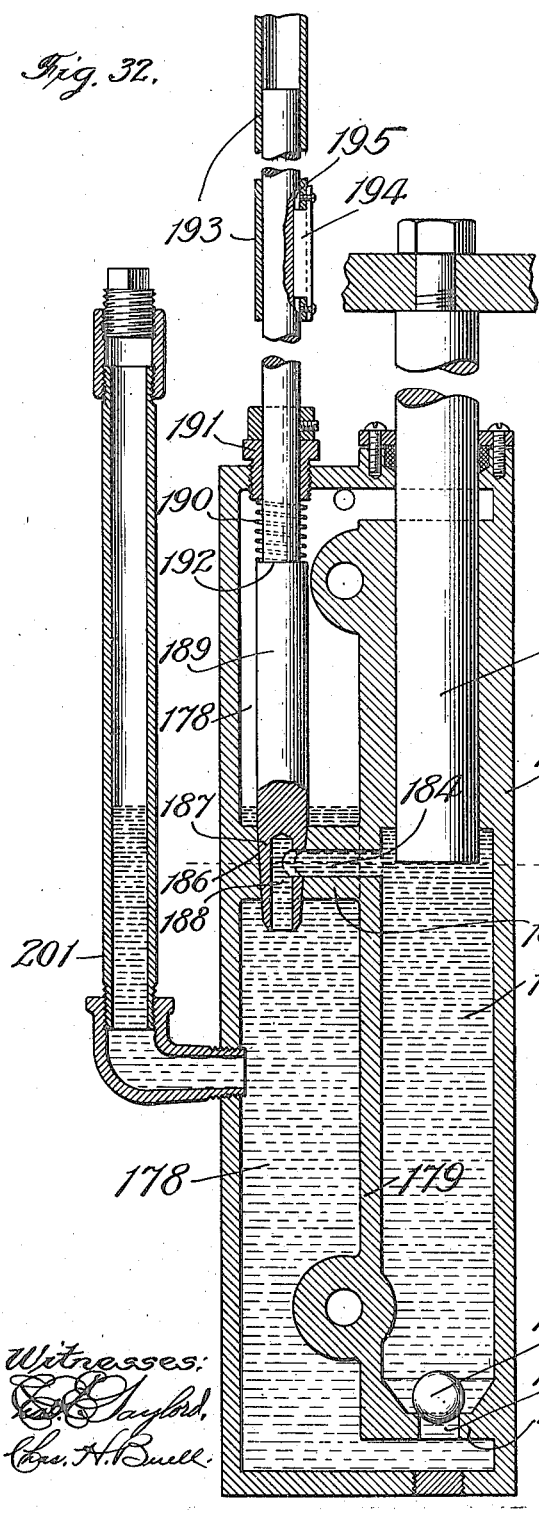
Figure 34:
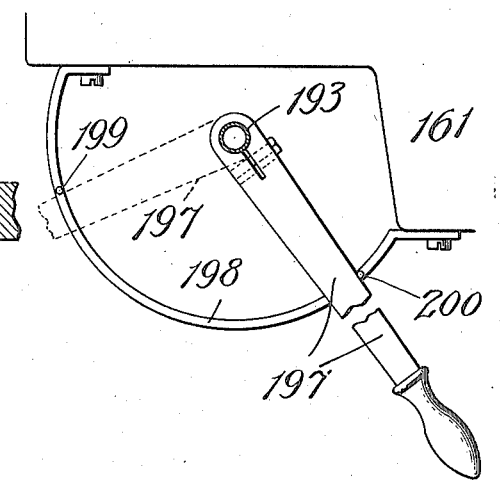
Figure 33:
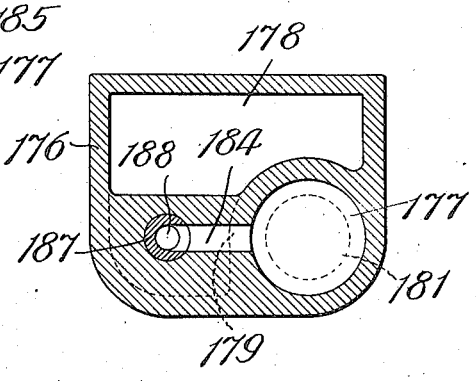

Referring to the accompanying drawings, Figure 1 is a view in side elevation of a woodworking machine embodying my improvements. Fig. 2 is a similar view taken from the opposite side of the machine. Fig. 3 is a front view of the machine. Fig. 4 is a rear view of the machine. Fig. 5 is a plan view of the machine, a portion of a cover for certain parts of the mechanism being broken away. Fig. 6 is a plan view of a portion of the machine with certain parts removed, showing a portion of the mechanism for actuating the tracer and cutters in continuous paths, the mechanism being shown in a position it assumes after the cutting operation has been completed and just before the automatically operative mechanism for arresting certain driving mechanism has been brought into operation. Fig. 7 is a broken view in section, the section being taken at the line 7 on Fig. 6 and viewed in the direction of the arrow. Fig. 8 is a view similar to Fig. 6, with the cover-plate of Fig. 6 removed, the automatically operating drive-arresting mechanism being shown in the position it assumes after it has operated to arrest the drive. Fig. 8ª is a detail view in elevation, partly sectional, of a portion of the automatic stopping mechanism shown in Fig. 8. Fig. 9 is a section taken at the irregular line 9—9 on Fig. 11 and viewed in the direction of the arrow. Fig. 10 is a section taken at the line 10 on Fig. 11 and viewed in the direction of the arrow. Fig. 11 is a section taken at the line 11 on Fig. 10 and viewed in the direction of the arrow. Fig. 12 is a view in elevation, partly sectional, of a portion of the stud which is operatively connected with the pattern-tracer and cutters and through the medium of which said tracer and cutters are driven about the ends of the pattern and lasts. Fig. 13 is a sectional view taken at the line 13 on Fig. 1 and viewed in the direction of the arrow, showing the positions occupied by the pattern-tracer and cutters relative to the work to be operated on, during the cutting operation. Fig. 14 is an enlarged sectional view taken at the line 14 on Fig. 3 and viewed in the direction of the arrow, this view, by full lines, representing the positions occupied by the reversible work-holder and its reversing means, when the toe-portions of the lasts to be finished are being operated on, and by dotted lines the positions occupied by these parts when the work-holder is reversed to present the heel portions to the cutters. Fig. 15 is a broken section taken at the line 15 on Fig. 14 and viewed in the direction of the arrow. Fig. 16 is a face view of a portion of one end of the work-holder. Fig. 17 is a face view of one of the adjustable bars carrying clamp devices for the lasts and model, or pattern. Fig. 18 is a similar view of the other adjustable bar coöperating with the bar of Fig. 17. Fig. 19 is a broken face view of the edge of the work-holder opposite to that shown in Fig. 16. Fig. 20 is a section taken at the line 20 on Fig. 18 and viewed in the direction of the arrow, this view showing the detail of one of the plurality of similar devices on the work-holder, for holding the work and pattern in place. Fig. 21 is a section taken at the line 21 on Fig. 16 and viewed in the direction of the arrow, with a key shown in elevation and in position for adjusting the bars of Figs. 17 and 18 relative to each other. Fig. 22 is a section taken at the line 22 on Fig. 13 and viewed in the direction of the arrow showing the work-holder and the manner of clamping a piece of work in position thereon. Fig. 23 is a broken sectional view taken at the line 23 on Fig. 22 and viewed in the direction of the arrow. Fig. 24 is a section taken at the line 24 on Fig. 23 and viewed in the direction of the arrow. Fig. 25 is a broken section taken at the line 25 on Fig. 13 and viewed in the direction of the arrow. Fig. 26 is a section taken at the line 26 on Fig. 25 and viewed in the direction of the arrow. Fig. 27 is a view in elevation of one of the similar cutter-mechanisms and the support for the same with the guard-means removed. Fig. 28 is a section taken at the line 28 on Fig. 27 and viewed in the direction of the arrow, the guard-means being herein shown in full lines in the position it assumes after the cutting operation has been concluded and in dotted lines in the position it assumes during the cutting operation. Fig. 29 is a bottom plan view of the form of spindle used for both the cutter and pattern tracer. Fig. 30 is a similar view of the blade-carrying member of the cutter-device shown in Figs. 27 and 28. Fig. 31 is a view in elevation of the lower end of the form of spindle used for both the cutters and the pattern tracer showing by a sectional view the form of the tracer and the manner of connecting it with the spindle. Fig. 32 is a section taken at the line 32 on Fig. 2 and viewed in the direction of the arrow, this view showing the hydraulic means for controlling the speed at which the work-holder carriage descends during the cutting operation, the parts being shown in uppermost position. Fig. 33 is a section taken at the line 33 on Fig. 32 and viewed in the direction of the arrow. Fig. 34 is a section taken at the line 34 on Fig. 2 and viewed in the direction of the arrow showing the handle device for controlling the hydraulic means of the last figure, the full lines representing it as moved to full open position for permitting the work-holder carriage to descend at maximum speed and the dotted lines representing the handle as moved to a position for preventing the carriage from descending. Fig. 35 is a view, partly sectional, of the mechanism for controlling the movement of the carriage to different heights, depending on the axial position of the work-holder, in repositioning said carriage following the conclusion of each cutting operation, the two positions of the mechanism being shown by full and dotted lines, respectively. Fig. 36 is a view in end elevation of a portion of the mechanism illustrated in Fig. 35 showing by full and dotted lines the two positions it assumes. Fig. 37 is a broken section taken at the line 37 on Fig. 35 and viewed in the direction of the arrow. Fig. 38 is a perspective view of the lower end of the rod of the stop-mechanism of Fig. 35 which coöperates alternately, upon reversal of the work-holder, with adjustable stop-devices for limiting the ascent of the work-holder carriage. Fig. 39 is a broken perspective view of the shaft carrying the cutter-guards, and the mechanism for releasably holding the guards in raised position and releasing the same at the conclusion of the cutting operation. Fig. 40 is a section taken at the line 40 on Fig. 3 and viewed in the direction of the arrow, this view showing the means for partially counterbalancing the work-holder carriage. Fig. 41 is an enlarged section, partly broken, taken at the line 41 on Fig. 2 and viewed in the direction of the arrow, this view showing the ball-bearing construction for the work-holder carriage. Figs. 42 and 43 are broken sections taken at the lines 42 and 43, respectively, on Fig. 41 and viewed in the direction of the arrow. Fig. 44 is a broken view of a ball-confining slide forming a part of the ball-bearing of Fig. 41. Fig. 45 is a view partly in elevation and partly sectional of the pattern-clamping device. Fig. 46 is a plan view of one of the similar toe-blocks of Fig. 16. Fig. 47 is an edge view thereof. Fig. 48 is a view in elevation, partly sectional, of the toe-blocks of the preceding figures and the bar carrying it, the section being taken at the line 48 on Fig. 46 and viewed in the direction of the arrow. Fig. 49 is a plan view of another form of work-clamp plate; and Fig. 50, a section taken at the line 50 on Fig. 49 and viewed in the direction of the arrow.

The operative parts of the machine are supported on a hollow standard 50 provided on its upper end with a plate 51 having depending flanges which fit over the top of the standard (Fig. 10) and containing set-screws 52 for holding the plate 51 rigid on the standard. The plate 51 is provided on its upper surface with parallel bar-sections 53 between which a slide 54, adapted to be moved forward and backward, is interposed, ball-bearings 55 being interposed between the bars 53 and the slide 54 to permit the slide to be easily shifted. The forward end of the slide 54 is provided with a bar-section 56, extending across the front of the machine, which carries a slide 57 movable to the right and to the left on the slide 54, the slide 57 carrying the pattern-tracing element and the cutters, as hereinafter described. The slide 54 is provided on its upper surface, between its ends, with a slide 58 (Figs. 10 and 11) supported between parallel bar-sections 59 on the slide 54, on ball-bearings 60 confined between said bar-sections and the slide 58, the latter being movable on the slide 54 in a path parallel with the path of movement of the slide 57, the slides 57 and 58 being operatively connected together whereby sliding movement of the one will produce corresponding sliding movement of the other, the means in the construction illustrated for thus operatively connecting together the slides 57 and 58 comprising a lever 61 fulcrumed between its ends, as indicated at 62, (Fig. 5) on the slide 54, and links 63 and 64, pivotally connected with the lever 61, as indicated at 65 and 66, respectively, and with the slides 58 and 57, respectively, at 67 and 68.

The slide 58 is provided with a depending stud 69, the upper end of which forms the pivot 67 (Fig. 10). The lower end of the stud 69 is formed with a spherical head 70 which extends into the upper, open, end of a tube 71 located in the standard 50, the tube 71 being rigid with, and rising from, a circular foot-member 72 dished on its under side and supported in an annular groove 73 in a base-plate 74 secured to the upper side of a horizontal partition 75 in the standard 50. The tube 71 contains a coiled spring 76 connected at one end with a cross-bar 77 secured in the sides of the tube, and at its lower end with a chain or other flexible connection, which latter extends through an opening in the plate 74, passes around a pulley 79 journaled on the plate 74, and is connected with an adjustable device 80 for adjusting the tension of the spring 76, the parts just described operating to yieldingly hold the tube 71 and the parts connected therewith in the upright position illustrated in Fig. 11, wherein the head 72 is seated throughout its circumference in the groove 73.

In the operation of the machine as hereinafter described, the member formed of the tube 71 and foot-member 72, is caused to move in a circular path, in such movement assuming an inclined position in opposition to the spring 76, as represented in Fig. 10 and to prevent said member from rotating axially pins 81, are provided in the groove 73 which register with the notches 82 in the bottom of the foot-member 72.

The stud 69 extends at a collar 83, journaled thereon, into a radiating slot 84 in a gear 85 rotatably mounted in a circular recess 86 in the plate 51 and driven as hereinafter described, whereby when the member, of which the tube 71 is a part, is held in inclined position (Fig. 10) the eccentricity of the stud 69 relative to the center of the gear 85 will cause it to be operated after the manner of a crank connection, thus causing said member to be moved in a circular path at its upper end as above stated.

The model-tracer of the machine is represented at 86ª and the cutters at 87, (Fig. 13) these elements being adapted to coöperate with a pattern 88 and with partly formed lasts 89, respectively, supported in a manner hereinafter described and so arranged that the uppermost extremity of the pattern and lasts will be coincident with the centers of the pattern-tracer and cutters, when the machine is in normal condition, viz., when the member, of which the tube 71 is a part, is in centralized position relative to the gear 85 (Figs. 6 and 11).

From the foregoing it will be readily understood that when the pattern and lasts are elevated to a position in which the pattern-tracer 86ª bears against the side of the pattern as shown in Fig. 13 and the cutters bear against the lasts as shown in this figure, the tube-member 71, by reason of the connections between the latter and the slide 57, supporting the cutters and pattern-tracers as hereinbefore described, will be caused to assume an inclined position (Fig. 10) against the resistance of the spring 76, and thus when the gear 85 is rotated it will cause the pattern-tracer to automatically travel in a horizontal path around the end of the pattern, the tracer being held in contact with the pattern by the spring 76 which tends to swing the tube-member 71 to upright, normal, position, the cutters 87 in this operation, by reason of their connection with the slide 57, traveling in paths corresponding exactly with that traveled by the pattern-tracer.

The illustrated mechanism for driving the gear 85 comprises a pinion 90 located in a recess in the plate 51 and meshing with the gear 85, (Fig. 6) this pinion being fixed on the upper end of a shaft 91 journaled in a bearing 92 on a bracket 97 attached to the standard 50, the lower end of this shaft carrying a bevel-pinion 93 meshing with a bevel-pinion 94 on a shaft 95 journaled in the main portion of the bracket 97 and in a depending bearing-lug 96, and the outer end of the shaft 95 carrying a friction disk 98. Coöperating with the disk 98 is a friction-roller 99 keyed on a shaft 100 to slide longitudinally thereon, (Fig. 4) the shaft 100, which carries a drive-pulley 101, being journaled in a bearing-member 102 pivotally hung, as indicated at 103, on spaced arms 104 on the bracket 97. The shaft 100 is driven from the pulley 101 by a belt 105 (Fig. 1) extending around this pulley and a pulley 106 rigid with a pulley 107 on a stationary shaft 108, the pulley 107 being driven by a belt 109 from a pulley 110 on a shaft 111, carrying tight and loose pulleys 112 and 113, respectively, and journaled in bearings on an adjustable bracket 50ª on the standard 50, the pulleys 112 and 113 being driven from a belt 114, driven from any suitable source and movable from the tight to the loose pulley, and vice versa, by means of a belt-shifter 115 which is pivoted at 116 to the bracket 50ª and carries pins 117 between which the belt 114 is embraced. The means shown for operating the belt-shifter 115 comprises a rock-shaft 400 journaled in bearings 401 and 402 on the standard, provided at one end with an operating crank-handle 403 and at its opposite end with a crank 404 pivotally connected at 405 with one end of a link 406 pivotally connected at its other end as indicated at 407, with the shifter 115.

The roller 99 (Fig. 4) is shiftable on the shaft 100 to control the speed at which the disk 98 rotates, by means of a lever 118 fulcrumed on the standard 50, at 119, and engaging at a pin 120 on its upper end an annular groove 121 in a hub-extension on the roller 99 and connected at its lower end, by a link 122, with a crank-arm 123 fixed on a shaft 124 rotatably mounted in bearings on the standard 50 and having an operating crank 123ª.

The mechanism for moving the roller 99 into contact with the disk 98, comprises a rod formed of telescoping sections 125 and 126, (Figs. 8 and 8ª) the section 125 being connected with a pin 127 on the member 102; a spring 128 connected at its opposite ends with the sections 125 and 126 and surrounding the latter, this spring affording a yielding connection between said sections; a vertically-disposed shaft 129 journaled in bearings 130 on the standard 50 and having crank-sections 131, 132 and 133, arranged in different angular positions, the rod 126 being connected with the crank-section 132; a curved lever 134 (Fig. 1) fulcrumed at 135 on the vertically-movable work-holder carriage, hereinafter described, and pivoted at 136 to one end of a bar 137 the opposite end of the latter embracing the crank 133, whereby swinging of the lever 134 on its fulcrum turns the shaft 129 and thus swings the bearing-member 102; in the particular construction illustrated, the lever 134 being employed merely to swing the member 102 toward the disk 98 for engaging the roller 99 with the latter, the disengagement of the roller 99 from the disk 98 being effected by automatically-operating mechanism hereinafter described, which operates at the conclusion of the cutting operation to stop the drive for the gear 85.

Each of the rotary cutting-devices 87 (Figs. 27–28) comprises a spindle 138 journaled at ball-bearings 139 in a tubular member 140 secured in upright position, by straps 141, to the front side of the slide 57, the member 140 being adjustable vertically by means of set-screws 142 set at an angle to each other and working in threaded openings in the deflected, converging, portions 143 of a bar 144 secured to the slide 57 alongside the member 140, these screws at their inner ends bearing against the converging surfaces 145 of a lug 146 on the tubular member 140. The lower end of each spindle 138 is provided centrally with a disk-shaped boss 141ª and a depending pin 142, a disk 143, provided with depending, curved, cutter-sections, or knives, 144 having sharpened edges 145, fitting at openings 146 and 147 therein over the boss 141ª and pin 142 and against the bottom of the spindle 138, a bolt 148 passing through the disk 143 and screwing into the spindle 138, serving to rigidly hold the disk 143 on the spindle. Each of the cutter-spindles 138 has secured thereon, at its upper end a pulley 149, these pulleys being connected by endless belts 150 with a roller 151 journaled at its ends in bearings provided in the ends of spaced arms 152 carried by, and extending rearwardly from, the slide 54. The roller 151 is driven, for rotating the cutter-spindles 138, by a belt 153 passing around the roller 151 and a pulley 154 rigid on the drive-shaft 111, the belts 150 being preferably so arranged, as illustrated, as to cause adjacent cutters to rotate in opposite directions for equalizing sidethrust, in the particular arrangement illustrated the two cutters at the extreme ends of the machine being belted to the roller 151 to rotate in one direction and the intermediate cutters belted to the roller to rotate in the opposite direction, the cutting edges of the blades being correspondingly disposed to perform the cutting operation.

As the roller 151 is carried by the slide 54 on which the cutter-carrying-slide 57 is mounted, the roller 151 will, in the operation of the machine as hereinafter described, shift forward and backward with the slide 57, and to insure sufficient tautness of the belt 153, a belt-tightener is provided, the roller 155 of which, which bears against the belt 153, is carried by a swinging arm 156 pivoted on one of the brackets in which the shaft 111 is journaled, a spring 157 operating to hold the pulley 155 against the belt 153.

The pattern-tracing device 86$^a$ is formed of a spindle journaled in a vertically-disposed tube secured on the front of the slide 57, with the lower end of the spindle formed with a boss and pin, all as described of the cutter-devices. At the upper end of the spindle of the tracing-device is provided a handle-portion 158 to facilitate the manual shifting of the slides 54 and 57 and the operating parts connected therewith, for positioning the tracing and cutting devices relative to the pattern and lasts to be finished, respectively, in starting the cutting operation as hereinafter described. The lower end of the spindle of the tracing-device is provided with a circular head apertured as indicated at 159 and 160 to fit over the boss 141$^a$ and pin 142 on the spindle 138, the bolt 148 holding this head firmly in place on the spindle.

In the preferred, illustrated, embodiment of my invention the lasts 89 to be operated on by the cutters, and the pattern 88 for engagement with the pattern-tracer, are supported in a manner hereinafter described, on a vertically movable carriage or slide 161 (Figs. 1 and 3) supported on the standard 50 which is allowed to slowly descend, in a path parallel with the axes of the spindles 138 of the cutters and pattern-tracers during the engagement of the latter with the lasts and pattern, respectively, thereby feeding the work to the cutters. The carriage 161 is slidable vertically on ball-bearings 162 (Figs. 41 and 42) at opposite sides of the machine, these bearings at each side of the machine being interposed between ball-races 163 and 164 provided on flanges 165 arranged at opposite edges of the standard 50 at its front side, and on rearwardly-extending flanges 166 at opposite edges of the carriage 161, edgewise-overlapping bars 167 and 168 secured to the flanges 165 and 166 holding the races 163 and 164 in place. The balls 162 at each side of the machine are prevented from descending to inoperating position by means of a plate 169 interposed between the races 163 and 164 and containing in its upper and lower ends, openings 170 in which the balls are confined. Each plate 169 contains intermediate the ball-bearings 170, a slot 171 in which a pinion 172 journaled on a pin 173 fixed on the plate 169, is confined, this pinion projecting beyond the plate 169 at opposite sides of the latter and meshing at all times, with upright racks 174 and 175 secured to the flange 165 and carriage 161, respectively. It is preferred that the pitch-diameter of the pinion 172 be the same as the diameter of the balls 162 for preventing undue friction between the balls 162 and the walls of the openings 171.

The mechanism for controlling the descent of the carriage 161 is formed of a fluid-tight housing 176 (Fig. 32) secured to the standard 50 and containing chambers 177 and 178 separated by a partition 179, the bottom 180 of the chamber 177 being spaced from the bottom of the chamber 178. The carriage 161 is provided with a depending plunger 181 which slides up and down in the housing 176, and works at its lower end in the chamber 177. The bottom 180 of the chamber 177 contains a port 182 controlled by a ball-valve 183, the upper end of this chamber opening into a passage 184 in a web 185 in the chamber 178, the web 185 containing a passage 186 extending therethrough and in communication with the passage 184, and forming a valve-casing for a rotatable tapered valve 187 containing a passage 188 opening through its lower end into the chamber 178 and through its side into the passage 184. The valve proper 187 is formed on the lower end of a rod 189 extending upwardly at its reduced upper end through the upper end of the chamber 178 with a coiled spring 190 surrounding the reduced portion of this rod and bearing at one end against a bushing 191 through which the rod 189 extends and at its opposite end against a shoulder 192 on the rod 189, and serving to hold the valve 187 to its seat. The rod 189 telescopes at its upper end with the lower end of a rod-actuating sleeve 193 carrying a feather 194 which extends into a longitudinally-extending groove 195 in the rod 189, which permits the sleeve 193 to move up and down on the rod.

The sleeve 193 is connected at its upper end with the carriage 161, as indicated at 196 (Fig. 3), and carries an operating lever 197 for rotating the sleeve 193 and thereby the rod 189, a bar 198 secured to the carriage 161, carrying spaced stops 199 and 200 for limiting the swinging movement of the lever 197, these stops being so positioned that when the lever 197 is swung into engagement with the stop 199 the valve 187 will be closed, and when swung into engagement with the stop 200 this valve will be fully open.

The housing 176 contains a fluid, preferably oil, wholly filling the chamber 177 but only partially filling the chamber 178, the chamber 178 being provided with a filler-tube 201. The hydraulic mechanism thus provided operates, when the valve 187 is opened, to permit oil to flow, under the action of the plunger 181, into the chamber 178, at a rate of speed depending on the degree to which the valve 187 is opened, and thus controls the speed at which the carriage 161 descends. When the carriage 161 is raised by hand, after a cutting operation is completed, the relatively large port 182 permits of the ready flow of oil into the chamber 177 as the plunger 181 rises.

The following is a description of the improved last and pattern-holding means for supporting these parts on the carriage, it being stated as a matter of introduction that means are provided for reversing the portion of the lasts and pattern after the stubs at one end of the lasts have been removed for presenting the other ends thereof to the cutters, without disturbing the clamps therefor.

The carriage 161 is provided with forwardly-extending arms 202 (Fig. 5) which afford journal supports for a work-holder 203 formed of a plate 204 extending across the front of the machine and provided with arms 205 at its ends at angles thereto, carrying trunnions 206 journaled in the forward ends of the arms 202. The inner face of the plate 204 is formed with converging surfaces 207 (Figs. 22 and 25) provided at intervals with transversely disposed ribs 208 and 209, alternating with each other. The ribs 208 are provided in pairs arranged in staggered overlapping position as shown of the pair at the extreme left-hand end in Fig. 13, in the construction shown there being three pairs of the ribs 208 and two of the ribs 209. At the upper and lower edges of the plate 204 I provide members 210 and 211 (Figs. 13–16), adjustable toward and away from each other on this plate, each being formed on its rear face with lugs 213 and 214, at which these bars bear against the ribs 208 and 209, respectively, and containing in its front side a longitudinally-extending channel 215, in which bars 216 and 217 are independently slidable, straps 212ª on the members 210 and 211 preventing displacement of the bars 216 and 217. The bars 216 and 217 contain notches 218 and 219, respectively, at their adjacent ends to receive a key, such as that represented at 220 and provided with pins 221, one of these pins coöperating with one of these notches and the other with a slot 222 in the channeled member containing these bars, for adjusting the latter bars relative to each other, upon rotating the key, for the purpose hereinafter explained.

The members 210 and 211 are provided at intervals on their rear sides with feet 223 carrying clamp-devices 224 for securing the members 210 and 211 on the plate 204 in adjusted position, these clamp-devices comprising blocks 225 having flanges 226 which enter the undercut portions 227 of grooves 228, in the ribs 208 and cap-screws 229 passing through the feet 223 and screwing into the blocks 225. The ends of the members 210 and 211 are provided with catches 233 adapted, in adjusting said members, to enter notches 231 provided on ribs 232 on the inner faces of the arms 205. These catches are preferably in the form of fingers 233 secured on the ends of rock-shafts 234 journaled in the ends of the channeled bars 210 and 211 and having actuating levers 235, stationary plates 236 secured to the bars 210 and 211, confining the fingers 233.

From the foregoing it will be understood that the members 210 and 211 are adjustable toward and away from each other along the converging ribs 208 and 209 and are rigidly secured thereon in adjusted positions.

The bar 216 of the member 210 carries at intervals lugs 237 and bearing-blocks 238 which coöperate with pivotally-supported devices 239 and bearing-blocks 240 secured to the bar 217 of the member 210, these parts being provided for engagement with the edges and bottom surfaces of the toe-portions of the lasts and pattern. The bar 216 of the member 211 is provided at intervals with lugs 241 and the bar 217 of this member with lugs 242, the member 210 carrying bearing-blocks 243. The lugs 237 and devices 239 are disposed alternately and the lugs 241 and 242 are similarly arranged, there being a pair of the bearing-blocks 238 and 240 between each pair of clips 237 and devices 239 and one bearing-block 243 between each pair of lugs 241 and 242. The lugs 237 and devices 239 are adapted to gage the toe-portions of the lasts and pattern on the work-holder with these portions of the lasts and pattern bearing against the blocks 238 and 240, and the lugs 241 and 242 adapted to gage the heel-portions of the lasts and pattern on the work-holder with the bottoms of the lasts and pattern resting against the blocks 243. The sets of lugs 241 and 242 are preferably arranged in converging position, as shown, their inner opposed surfaces being inclined, as represented at 241ª and 242ª, to cause them to bear against those portions of the lasts which are the most uniform.

It will be understood from the foregoing that by shifting the bars 216 and 217 lengthwise of each other in the channel 215, as stated, the coöperating clamping elements described are likewise shifted adapting the work-holder for supporting lasts and patterns of different widths, the above described connections of the members 210 and 211 with the plate 204 permitting of the adjusting of these members toward and away from each other to accommodate lasts and patterns of different lengths.

The provision of the gaging devices on the bars 216 and 217, as described, causes each set of devices to become simultaneously adjusted upon shifting these bars, for gaging all of the lasts and the pattern. These devices are preferably each formed of a block 244, (Fig. 20) with a curved inner face, pivoted on a pin 245 carried by the bar 217 of the member 210 and pivotally connected at 246 with a toggle formed of a link 247 pivoted at 248 to a crank 249 on a shaft 250 fixed in a plate 251 fixed on the said bar 217 and carrying a finger-grip 252 for actuating the crank 249, these parts being so arranged that when the block 244 is swung into engagement with the edge of the last or pattern the toggle-joint 246 will extend beyond the line connecting the points 246 and 250, for holding the crank 249 in place, a spring 253 operating to hold the toggle in position beyond dead-center in clamping position and movable when the toggle is thrown in the opposite direction, to a position in which it does not oppose the last referred to movement of the toggle.

The pattern 88 and the lasts 89 are held against the bearing blocks 238, 240 and 243 by means of clamps 254 and 255, respectively. The clamp 254 is formed of an apertured plate 256 provided with studs 257 and 258 on its rear side adapted to bear against the top of the pattern, and clamp-nuts 259 screwing upon threaded studs 261 on the plate 204 at opposite sides of the pattern and passing through slots 256ª in the plate 256, the nuts bearing against the face of the latter. One of the studs 261 is formed of sections pivotally connected together at 261ª to permit the clamp 254 to be readily applied to clamping position. The clamps 255, one provided for each pair of lasts, are each formed of a spider-plate 262 carrying studs 263, one pair thereof at each side of the plate 262 for engagement with the tops of the lasts, a threaded stud 264 secured to, and projecting outwardly from, the plate 204 intermediate each pair of lasts 89 and extending through an opening 265 in the plate 262, and a clamping sleeve 266 screwing upon the outer threaded end of the stud 264. The opening 265, preferably, is elongated and extends lengthwise of the plate 262 and is provided on its outer face at opposite sides of the opening 265 with cam-surfaces 267 which are engaged by lugs 268 on the sleeve 266 and operate to force the plate 262 into rigid clamping engagement with the lasts when the sleeve 266 is turned to the right on the stud 264, the outer end of the sleeve 266 being provided with a head 269 equipped with wings 269ª for facilitating the turning of the sleeve. The lugs 268, head 269 and openings 265 are so proportioned that the lugs and head will pass therethrough upon applying the plate 262 to the lasts, these lugs being spaced from the head 269 a distance greater than the thickness of the plate 262 to avoid the necessity for removal of the plate 262 from the stud 264 in preliminarily adjusting the plate 262, or sleeve 266, on the stud for different sizes of lasts, the operator merely moving the plate 262 to a position in which the plate will extend opposite the space between the lugs 268 and the head 269, and after the desired adjustment of the sleeve 266 on the stud 264 has been effected, repositioning the plate 262 beyond the lugs 268 for engagement of the latter with the cam surfaces 267. To prevent the plate 262 from dropping off the stud 264, during reversal of the work-holder and to hold the plate 262 in raised position during the reversal of the lasts on the holder and application of different lasts to the latter, I provide a spring 270 on the head 269 which frictionally engages the wall of the opening 265, this spring permitting the operator to pull the plate 262 up on the sleeve 266, but preventing it from falling off by its own weight; and to prevent undue rotation of the sleeve 266 on the plate 262 I provide lugs 262ª on the plate 262 at opposite sides of the opening 265.

The work-holding structure, by reason of its construction as hereinbefore described, is rendered reversible on its trunnions 206 for presenting to the cutting and pattern-tracing elements either ends of the lasts and pattern. In practice, the work-holder is swung to a position for presenting one end of the lasts and pattern for removing the studs at this end of the lasts and thereupon reversed, without disturbing the last and pattern-clamping devices, to a position for presenting the other end of the lasts and pattern for removing the studs at this end of the lasts.

To facilitate the reversing of the work-holder on its trunnions 206, and automatically locking it in either of the positions into which it is swung, I provide the following-described mechanism: Pivoted at 271 (Fig. 14) on the lower end of the carriage 161 is a bell-crank lever 272 engaging at its upper end an adjusting device 273 for varying the position of the lever 272 on its pivot 271. The outer end of the lever 272 is pivotally connected at 274 with a sleeve-member 275 open at its upper end and provided intermediate its end with an enlarged housing 276 containing a pinion 277 fixed on a shaft 278 journaled in a boss 279 on the housing 276 and provided with an operating crank 280. A rack-bar 281 telescopes with the upper end of the sleeve 275 and meshes with the pinion 277, this bar being pivotally connected with a bolt 282 which passes through and is adjustable in a slot 283 in an extension 284 on the plate 204 and carries tight and loose washers 285 and 286, respectively, at opposite sides of the extension 284 adapted to clamp the extension 284 between them upon tightening a handle-equipped nut 287 threaded on the left-hand end of the bolt 282 in Fig. 3. The teeth on the rack-bar 281 represented at 288 are of uniform size as represented, except for the lowermost tooth represented at 289 which is substantially double the width of the other teeth and spaced from the latter a distance substantially equal to twice the width of the teeth 288, as represented at 290. The teeth on the pinion 277 represented at 291 are of uniform size, excepting one tooth represented at 292 which is substantially double the width of the teeth 291 and spaced from the tooth 291 immediately below it, a distance substantially equal to twice the width of a tooth 291. As shown in Fig. 15 when the handle 280 is turned in a clockwise direction to carry the pinion to the position therein shown the tooth 292 engages the lowermost one of the teeth 288 and locks the rock-bar 281 against downward movement, by the wedging of the tooth 288 with the tooth 292. When it is desired to reverse the position of the work-holder, the operator turns the pinion 277 in an anti-clockwise direction until the pivot-point 282 is at the lowermost point in its travel and thereupon reverses the rotation of the pinion 277, the lowermost tooth 288 interlocking with the tooth 292 as soon as the pinion has been rotated to the position shown in Fig. 15. Thus to swing the work-holder on its trunnions to either position the operator turns the pinion first in an anti-clockwise direction and thereafter in a clockwise direction, the holder automatically locking in the position to which it is moved.

The means hereinbefore referred to for automatically disengaging the drive for the gear 85 comprises a lever 293 (Figs. 6–8) journaled at one end on the crank 131 and lying at its opposite end in a recess 294 in the underside of the plate 51 and during the operation of the machine, bearing at a shoulder 295 against the plain, inset, portion 296 of the gear 85. The lever 293 coöperates with a sliding-pin 297 which is located in a radially-disposed slot 298 in the underside of the gear 85. The pin 297 is secured to a block 299 mounted to slide radially of the gear, in a slot 300 therein alining with the slot 84, the block 299 being provided at opposite edges with upper and lower flanges 301 for confining it on the gear. A spring 302 secured to the gear 85 at 303 and to the block 299 tends to force the block toward the center of the gear 85 to a position in which the outer end of the pin 297 is withdrawn from the outer edge of the plain portion 296 of this gear and thus to a position in which the pin 297 will not engage the lever 293. Extending through the block 299 and slidable therein is a pin 304 in the form of a bolt, which is held normally in extended position (Fig. 10) by a spring 305 encircling the bolt 304 and lying within a socket 306 in the block 299, the spring 305 bearing at one end against the end-wall of the socket 306 and at its opposite end against the head of the bolt, a nut on the latter limiting the movement of the latter under the action of the spring. Spaced lugs 307 and 308 limit the movement of the block 299 in both directions, and the spring 305 serves as a buffer when the collar 83 strikes the end of the pin 304 in the movement of the stud 69 to central position relative to the gear 85, as hereinafter described.

The lever 293 is provided with a cam-surface 309 adapted to coöperate with a cam-surface 310 in the wall of the recess 294 in the plate 51, and with a cam-surface 311 at its opposite edge adapted to coöperate with a lug 312 on the top of the housing 50 and rising into the recess 294, the cam-surface 311 and lug 312 serving to swing the lever 293 at its shouldered end 295 away from the gear 85 when the shoulder 295 is engaged by the pin 297, and the cam-surfaces 309 and 310 serving to swing this end of the lever 293 toward the gear 85 into engagement with the surface 296 of this gear, when the shaft 129 is turned by hand to engage the roller 99 with the friction disk 98 for driving the gear 85.

The operation of the machine is as follows: The pattern 88 and lasts 89 from which the stubs on the toe and heel portions thereof are to be removed, are applied to the reversible work-holder in the position shown in Fig. 13 (wherein one of the lasts 89 is omitted) to extend in upright position parallel to each other, the lasts and pattern being clamped to the work-holder to rest at the toe and heel portions thereof against the bearing blocks 238, 240 and 243 respectively, by means of the lugs 237, 241 and 242, movable blocks 239 and the clamping-devices formed of the plates 256 and 262. The operator in clamping the lasts and pattern to the work-holder may shift the members 210 and 211 toward or away from each other to cause the clamping lugs and blocks just referred to to engage the edges of the heel and toe portions of the lasts and pattern at the desired points, this feature adapting the work-holder to support lasts and patterns of different lengths, the provision of the plate 204 with its inclined surfaces operating to cause the lasts and patterns regardless of their size to extend medially in alinement with the trunnions in which the work-holder is mounted, in order that the patterns and lasts regardless of their size shall be substantially centrally positioned relative to the coöperating pattern tracer and the respective rotary cutters.

In the clamping operation described, the operator by using the key 220, as hereinbefore described, shifts the bars 216 and 217 in the channels 215 to adjust the lugs and blocks carried thereby for rigidly engaging the edges of the toe and heel portions of the lasts and pattern, the clamping members of which the blocks 239 are parts, being swung by the operator to the position illustrated in Figs. 16 and 20, the construction of these devices as hereinbefore described, permitting of the firm clamping of the lasts and patterns at their edges even should they vary slightly in width. After adjusting the bars 215 and 216, as stated, the operator by tightening set screws 313 screwing into the channel bars 210 and against one of the bars in the channel 215, rigidly clamps these adjustable bars in their adjusted position. The clamping devices 254 and 255 are then applied to the pattern 88 and lasts 89, respectively, as hereinbefore described.

The parts of the machine are so proportioned and arranged as shown as to cause the pattern 88 and lasts 89 to be centralized relative to the axes about which the spindles 138 of the pattern-tracer and rotary cutters 86 and 87, respectively, rotate when the pattern-tracer and cutters are in normal position, namely, when the machine is at rest, in which position the stud 69 carried by the slide 58 is coincident with the center of the gear 85 and the spring-controlled tubular member 71 is in upright position (Fig. 11). In this normal position of the machine, guard devices for protecting the hands of the operator in the application of patterns and lasts to the work-holder, are provided, these guard devices coöperating with the cutters and each comprising a yoke-shaped member 314, pivotally connected as indicated at 315 to the lower straps 141 of the cutter devices, these yokes being provided with cross-members 316 and 317, which when the guard devices are in protecting position extend across the front of the blade-equipped portions of the cutters and beneath them, the member 317 being extended rearwardly beyond the yoke 314, all as shown in Fig. 28, which forms adequate protection for the operator against contact with the sharpened edges of the cutter. The guard devices are connected together by a rod 318 extending therethrough and provided within each yoke with a collar 319 at which the guard devices bear against the lower ends of the cutter-spindles 138 when the guard devices are in protecting position (Fig. 28). The guard devices are releasably held in the inclined position represented by dotted lines in Fig. 28 during the operation of the cutters by engagement at a collar 320 thereon with the arm of a yoke-member 321 (Fig. 39) provided on a member 322, supported to slide vertically in a strap 323 on the slide 57, the forward arm 324 of the yoke 321 being beveled at its front side as represented at 325. When the guard devices are turned to the position shown by dotted lines in Fig. 28, the collar section 320 engages the beveled surface 325 which causes the member 322 to rise and permit said collar section to enter behind the arm 324, whereupon the member 322 descends, thus releasably holding the guard devices in raised position until the member 322 is raised, whereupon the guard devices automatically drop to the position represented in full lines in Fig. 28.

In the construction illustrated, the guard devices are automatically released to drop to the full line position represented in Fig. 28 after the conclusion of the cutting operation, the means provided for this purpose being as follows: Journaled in a bearing 326 on the top of the slide 54 is a shaft 327 provided at one end with an arm 328 expanded as shown at 329, the member 322 and the arm 328 being so positioned that when the mechanism for moving the pattern-tracer and cutters in rotary paths around the pattern and lasts, has assumed normal position, namely, after the cutting operation has been completed, the lower member of the end 322 will extend directly above the expanded portion 329 of the arm 328. The other end of the shaft 327 is provided with an arm 330 having a horizontal extension 331 adapted to coöperate with a pawl device 332, pivoted at 333 on a bar 334, vertically adjustable on the carriage 161 and adapted to be held in adjusted position by means of clamp-screws 335. The pawl 332 is normally held at its weighted end in the position illustrated in Fig. 39 by engagement with the pin 337 on the bar 334. The pawl 332 is adapted to engage the arm 331 during the descent of the carriage 161 after the cutting operation is completed and thereby rock the shaft 327 and release the arm 324 from engagement with the collar 320, thus permitting the guard devices to drop to the full line position represented in Fig. 28, the position of the pin 337 permitting the pawl 332 to swing downwardly at its arm-engaging end to pass upwardly beyond the arm 331 when the carriage 161 is raised to reposition the pattern and lasts relative to the pattern-tracer and cutters, respectively.

After clamping the pattern and lasts in the work-holder as stated, the operator, assuming the guard devices 314 to have been swung into the dotted position represented in Fig. 28, lifts the carriage 161 and simultaneously therewith, by grasping the handle 158, shifts the slide 54 to the rear, to remove the pattern-tracer and cutters from a position directly above the pattern and lasts respectively. The operator lifts the carriage to a position wherein the cutting edges of the rotary cutters will extend preferably slightly below the point at which the cutting should begin on the lasts to remove the stubs, and thereupon releases his grasp on the slide to cause the pattern-tracer and the cutters to bear against the sides of the toe portions of the pattern and lasts respectively, as represented in Figs. 1, 2 and 22, the movement of the slide 54 as stated, thereby shifting the stud 69 rearwardly and causing the tube-member 71 to occupy an inclined position against the resistance of the spring 76, as illustrated in Fig. 10.

The carriage 161 being relatively heavy, I prefer to provide counterbalancing means therefor which comprise a counterweight 338 in the standard 50 connected with one end of a chain 339 which extends over a pulley 340 on a shaft 341 journaled in lugs on the housing 50, the other end of the chain 339 being connected with the carriage 161, as indicated at 342. The connection between the chain 339 and counterweight 338 comprises a rod 343 which slides in a plug 344 screwed into the upper end of an opening 345 in the counterweight 338, this rod carrying a head 346 at its lower end between which and the plug 344 a coiled spring 347 encircling the rod 343 is confined. The chain 339 connects with the upper end of the rod 343 and thus the counterweight 338 is supported by a spring-connection. The counterweight 338 is preferably of such weight as to not quite balance the carriage 161 and the parts carried thereby, in order that the carriage may descend under its own weight. The operator after having positioned the lasts and pattern and the pattern-tracer and cutters as stated, and assuming the spindles 138 to be rapidly rotating through the medium of the belted connections between the pulley 154, roller 151, and pulleys 149 on the spindles 138, swings the lever 134 to the left in Fig. 3, which thus turns the shaft 129 with it the cranks 133, 132 and 131 in clockwise direction, drawing the lever 293 to the position illustrated in Fig. 6, wherein it engages at the shoulder 295 with the plain portion 296 of the gear 85 and through the medium of the rod 126 swings the bearing frame 102 to the right in Fig. 10; moving the roller 99 into engagement with the friction disk 98, thus causing the gear 85 to rotate; the eccentric relation of the stud 69 to the center of the gear 85 causes the stud 69 to be operated on in a manner similar to a crank-action, thus causing the stud to travel in an endless path corresponding exactly with the endless path traveled by the pattern-tracer in the travel of the latter around the end of the pattern, it being understood that as the tendency of the spring 76 is to bring the stud 69 to centralized position relative to the gear 85 and consequently the pattern-tracer to a centralized position relative to the end of the pattern, the pattern-tracer will be caused to hug the surface of the pattern around which it is caused to travel by the action of the gear on the stud 69.

The operator thereupon swings the handle 107 from the dotted position in Fig. 34 to the right for adjusting the port 188 in the valve 187 relative to the passage 184 which opens the chamber 177 to the chamber 178, thereby permitting the carriage 161 to gradually descend at a speed depending upon the degree to which the valve 187 is opened, thus gradually lowering the pattern and lasts. Thus, the pattern and lasts are fed to the pattern-tracer and cutters as the carriage 161 descends, the pattern-tracer and cutters continuing to revolve in similar endless paths and cutting away the stubs on the toe-portions of the lasts to exactly conform with the toe-portion of the pattern, the pattern-tracer and cutters continuing this rotatable movement until the carriage 161 in its descending movement has lowered the pattern and lasts below these tracing and cutting elements. As the path through which the pattern-tracer moves becomes shorter and shorter, as the upper end of the pattern is approached by the tracer, the stud 69 moves nearer and nearer toward the center of the gear 85, and upon reaching this centralized position, which occurs after the cutting operation is completed, strikes the pin 304 and projects the outer end of the pin 297 into a position wherein it will engage the shoulder 295 of the lever 293 (Fig. 6) and shift this lever to the position illustrated in Fig. 8, thereby turning the shaft 129 in an anti-clockwise direction which moves the roller 99 out of frictional engagement with the friction disk 98 for disconnecting the driving mechanism for the gear 85, it being preferred that brake means coöperating with the disk 98 be provided for automatically arresting the momentum of the disk when disconnected as stated, the means shown (Fig. 10) comprising a brake-shoe 349 provided on an arm 350 secured in the rocking frame 102 (carrying the friction roller 99), and a spring 351 secured at one end to the standard 50 and at its opposite end to an upturned portion of the rod 350, this spring serving to force the shoe 349 into engagement with the periphery of the disk 98 upon disengaging the roller 99 from the disk 98 as before stated. The continued descent of the carriage 161 after the cutting operation has been completed causes the pawl 332 to engage the arm 331 and rock the shaft 327 against the action of a spring 348 (Fig. 1) which tends to hold the shaft 327 and the parts connected therewith in the position illustrated in Fig. 39, thus engaging with the member 322 and lifting the arm 324 out of engagement with the collar 320 whereupon the guard devices for the cutters drop to the full line position represented in Fig. 28, the pawl 332 in this operation sliding off the end of the arm 331.

After the carriage 161 has come to rest at the end of its descent, following the completion of the cutting operation, the work-holder is reversed on its trunnions 206 to present uppermost the heel-portion of the pattern and lasts from which latter the stubs are to be removed, by operating the rack and gear mechanism shown in Figs. 14 and 15 as hereinbefore described, the operator unlocking the work-holder in the position shown in full lines in Fig. 14 and thereupon swinging the latter to the dotted position represented therein and locking it in this position by the mere act of rotating the crank 280 first in an anti-clockwise direction and then in a clockwise direction, as hereinbefore stated. The carriage is then again raised by the operator to position the pattern-tracer and cutters relative to the heel portions of the pattern and lasts as explained of the operation for removing the stubs from the toe-portions of the lasts and the machine then set in operation, as hereinbefore explained.

It may be stated in this connection that by constructing the work-holder as shown and described, the lasts and pattern will occupy the proper positions, when either the toe or heel portions thereof are uppermost, for action thereon by the pattern-tracer and cutters to cause the lasts when finished to correspond exactly with the pattern, the adjustments at 273 and 282 permitting of the adjusting of the reversing mechanism relative to the work-holder, to such positions as may be required by the use of different shaped lasts, for properly positioning the toe and heel portions of the lasts and pattern without readjusting the lasts and pattern on the work-holder.

The heel portion of the last being flat relative to the toe-portions, the length of feed of the lasts to the cutters is shorter than the length of feed required when the machine is operating on the toe-portions of the lasts, and thus the carriage need not be elevated as high in the one case as in the other. In the preferred illustrated embodiment of my invention, means are provided for automatically arresting the upward movement of the carriage, permitting it to rise to one height when the toe-portions of the lasts are to be operated on, and to a different height when it is to operate on the heel portions, a description of these means being as follows: Secured to the standard 50 is a bar 350 provided in its face with a groove 351 having undercut sides 352 and 353, the bar 350 carrying stop-blocks 354 provided with flanges 355 and 356, respectively, which extend into the groove 351 and have surfaces 357 which oppose and conform in shape with the surfaces 352 and 353 respectively, the outer ends of these blocks being provided with rearwardly extending flanges 358 in which set-screws 359, adapted to screw against the sides of the block 350 for clamping the blocks 354 and 355, in place on the bar 350, operate, these blocks being independently adjustable of each other in a vertical direction on the bar 350. Pivoted on a stud 360 on the carriage 161 is a bell-crank lever 361, the downwardly extending arm 362 of which is provided with a rearwardly extending shoulder 362$^a$, adapted to coöperate with the undersides of the blocks 354 and 355, as hereinafter explained. The other arm 363 of this lever is pivotally connected with a vertically disposed arm 364 pivoted on the end of one of the trunnions 206 at a point eccentric to the center of the trunnion, as indicated at 365, this pivot, when the work-holder is in one position, being relatively above the center of the trunnion 206, and when the work-holder is reversed, being relatively below the center of this trunnion as represented in Fig. 36. It will be understood from Figs. 35 and 36 that when the work-holder is in a position which causes the pivot 365 to be in uppermost position, the parts described will be in the full line position represented in these figures wherein the shoulder 362$^a$ will extend in a position in which it will engage the block 354 when the carriage 161 is raised by the operator, and when the pivot 365 is in the lowermost position, the parts described will occupy the positions represented by dotted lines in these figures, in which position the shoulder 362$^a$ will engage the block 355 when the carriage is raised by the operator. Thus, by adjusting the blocks 354 and 355, the operator may cause the carriage to be automatically stopped in its ascent in such positions as will insure the desired setting of the pattern-tracer and cutters relative to the pattern and lasts preliminary to the cutting operation.

Referring to Figs. 49 and 50, these views show a modification of the last-clamps of the preceding figures, wherein the clamp in this case, instead of being formed as a rigid structure, is formed of two main sections 500 and 501 with lugs for engagement with the tops of the lasts as explained of the plates 262, the sections 500 and 501 being pivotally connected together by a pin 502, the section 500 containing a recess 503 into which a lug 504 on the section 501 extends, the lug 504 being of less width than the recess 503, whereby the rotary movement of the sections 500 and 501, relative to each other, is limited. The provision of the sectional clamps, as described, is of great advantage where the lasts vary somewhat as it causes the clamp to have a four-point contact with the last under all conditions. The upper surfaces of the bearing-blocks 238 and 240 are preferably of spherical contour, as shown in Figs. 46, 47 and 48 with the highest points located preferably close to the upper ends of the blocks in Fig. 16 and at the edges thereof adjacent to the lugs 237 and 239, respectively, where the blocks are cut away, as shown at 238ᵃ and 240ᵃ. The shaping of these blocks, as stated, serves to cause the lasts to bear against them close to the lugs 237 and 239, and the blocks to present such bearing surfaces that the lasts, regardless of their shapes and sizes, will seat firmly thereon.

While I have illustrated and described a particular embodiment of my invention, I do not wish to be understood as intending to limit it thereto as the same may be variously modified and altered without departing from the spirit of my invention. Furthermore, certain of the features forming the subject of my invention are adapted for use in machines other than that of the character illustrated, and it is my intention and desire to protect these features as fully and completely as the prior state of the art will permit.

What I claim as new and desire to secure by Letters Patent is—

1. The combination of a support, a carriage reciprocable on said support, a reversible work-holding member on said carriage, and means, controlled by the position on said carriage of said work-holding member, for limiting the movement of said carriage.

2. The combination of a support, a carriage reciprocable on said support, a reversible work-holding member on said carriage, and adjustable means, controlled by the position on said carriage of said work-holding member, for limiting the movement of said carriage.

3. The combination of a support, a carriage reciprocable on said support, a reversible work-holding member on said carriage, and means operating, when said work-holding member is in one position, to stop the carriage at a predetermined point, and when said member is in inverted position, to stop the carriage at a different predetermined point.

4. The combination of a support, a carriage reciprocable on said support, a reversible work-holding member on said carriage, and means, automatically controlled by the shifting movement of said member on said carriage, operating when said work-holding member is in one position, to stop the carriage at a predetermined point, and when said member is inverted, to stop the carriage at a different predetermined point.

5. The combination of a support, a carriage reciprocable on said support, a reversible work-holding member on said carriage, stop-devices independently adjustable on said support, and shiftable means movable with said carriage for engaging either of said stop-devices.

6. The combination of a support, a carriage reciprocable on said support, a reversible work-holding member on said carriage, stop-devices independently adjustable on said support, shiftable means movable with said carriage for engaging either of said devices to limit the movement of said carriage, and means operatively connected with said member for automatically shifting said means out of position for engaging one of said stop-devices and into position for engaging the other of said devices, upon adjusting said member on said carriage.

7. The combination of a support, a carriage reciprocable on said support, a reversible work-holding member on said carriage, stop-devices independently adjustable on said support, shiftable means movable with said carriage for engaging either of said devices to limit the movement of said carriage, and means operatively connected with said member eccentrically of the pivots on which it is supported, for automatically shifting said means out of position for engaging one of said stop-devices and into position for engaging the other of said devices, upon adjusting said member on said carriage.

8. The combination of a support, a carriage reciprocable on said support, a reversible work-holding member trunnioned on said carriage, stop-devices adjustable on said support, an arm pivotally-supported on said carriage and provided with a portion adapted to engage either of said stop-devices upon adjusting said arm on its pivot, to limit the movement of said carriage, and means eccentrically connected with one of said trunnions and with said arm for automatically shifting said arm out of position for engaging with one of said stop-devices and into position for engaging the other of said devices, upon adjusting said member on its trunnions.

9. The combination with a pivotally-supported element, of means for reversing said element on its pivot comprising a pivotally-supported member, a pinion journaled on said member, and a rack pivoted to said element and meshing with said pinion.

10. The combination with a pivotally-supported element, of means for reversing said element on its pivot comprising a pivotally-supported member, a pinion journaled on said member, and a rack pivoted to said element and meshing with said pinion, the teeth on said rack and pinion being constructed and arranged to wedge together against movement of said rack in one direction.

11. The combination with a pivotally-supported element, of means for reversing said element on its pivot comprising a pivotally-supported member, a pinion journaled on said member and provided with a tooth of greater length than the other teeth thereon, and a rack pivoted to said element and meshing with said pinion.

12. The combination with a pivotally-supported element, of means for reversing said element on its pivot comprising an adjustable support, a member pivoted on said support, a pinion journaled on said member, and a rack pivoted to said element and meshing with said pinion.

13. The combination with a pivotally-supported element, of means for reversing said element on its pivot comprising a pivotally-supported member, a pinion journaled on said member, and a rack adjustably pivoted to said element and meshing with said pinion.

14. The combination with a pivotally-supported element, of means for reversing said element on its pivot comprising an adjustable support, a member pivoted on said support, a pinion journaled on said member, and a rack adjustably pivoted to said element and meshing with said pinion.

15. In a wood-working machine, the combination of a rotary member containing a radially-disposed slot, means for rotating said member, a member extending into said slot, yieldable means tending to hold said last-named member in a position coincident with the axis of said rotary member, a rotary cutter, and pattern-guided means operatively connected with said second-named member for guiding the movements of said cutter and operating to hold said second-named member in non-coincident position relative to said rotary member, and in opposition to said yieldable means during the engagement of said pattern-guided means with the pattern.

16. In a wood-working machine, the combination of a rotary member, means for rotating said member, a shiftable member cooperating with said rotary member, means operating when said last-named member extends eccentrically of said rotary member, to drive said last-named member, yielding means operating to draw said last-named member to a position concentric with said rotary member, a cutter, pattern-guided means operatively connected with said second-named member for guiding the movements of said cutter and operating to hold said second-named member in eccentric position relative to said rotary member and in opposition to said yielding means when said pattern-guided means engage the pattern, and means actuated by said second-named means for discontinuing the operation of the latter.

17. In a wood-working machine, the combination of a rotary member, means for rotating said member, a shiftable member cooperating with said rotary member, means operating when said last-named member extends eccentrically of said rotary member, to drive said last-named member, yielding means operating to draw said last-named member to a position concentric with said rotary member, a cutter, pattern-guided means operatively connected with said second-named member for guiding the movements of said cutter and operating to hold said second-named member in eccentric position relative to said rotary member and in opposition to said yielding means when said pattern-guided means engage the pattern, means for holding a pattern and the material to be cut, movable relative to said tracer and cutter for feeding the pattern and work to said tracer and cutter, and means operating automatically to discontinue the operation of said second-named means.

18. In a wood-working machine, the combination of a rotary member, means for rotating said member, a shiftable member cooperating with said rotary member, means operating when said last-named member extends eccentrically of said rotary member, to drive said last-named member, yielding means operating to draw said last-named member to a position concentric with said rotary member, a cutter, pattern-guided means operatively connected with said second-named member for guiding the movements of said cutter and operating to hold said second-named member in eccentric position relative to said rotary member and in opposition to said yielding means when said pattern-guided means engage the pattern, means for holding a pattern and the material to be cut, movable relative to said tracer and cutter for feeding the pattern and work to said tracer and cutter, and means actuated by said second-named means for discontinuing the operation of the latter.

19. In a wood-working machine, the combination of a rotary member, means for rotating said member, pattern-guided means including a member having driving engagement with said rotary member during the engagement of said last-named means with the pattern, means tending to return said first-named member to a position coincident with the axis of said rotary member, and means operated by said second-named member when the latter reaches a position coincident with the axis of said rotary member, for automatically discontinuing the rotation of said rotary member.

20. In a wood-working machine, the combination of a rotary member, means for rotating said member, a shiftable member cooperating with said rotary member, means operating when said last-named member extends eccentrically of said rotary member, to drive said last-named member, yieldable means operating to draw said last-named member to a position concentric with said rotary member, a cutter, pattern-guided means operatively connected with said second-named member for guiding the movements of said cutter and operating to hold said second-named means in eccentric position relative to said rotary member and in opposition to said yielding means when said pattern-guided means engage the pattern, a shiftable device operating to control the driving of said rotary member, and means carried by said rotary member and automatically engageable by said shiftable member when the latter reaches a position concentric with said rotary member and movable to a position for engaging said shiftable device.

21. In a wood-working machine, the combination of a rotary member, means for rotating said member, a shiftable member cooperating with said rotary member, means operating when said last-named member extends eccentrically of said rotary member, to drive said last-named member, yieldable means operating to draw said last-named member to a position concentric with said rotary member, a cutter, pattern-guided means operatively connected with said second-named member for guiding the movements of said cutter and operating to hold said second-named means in eccentric position relative to said rotary member and in opposition to said yielding means when said pattern-guided means engage the pattern, a shiftable device for controlling the operation of said first-named means and having a shoulder portion, and a shiftable pin carried by said rotary member and adapted to be automatically moved into position for engaging said shoulder portion when said shiftable member reaches a position concentric with said rotary member.

22. In a wood-working machine, the combination of a rotary member, means for rotating said member, a shiftable member cooperating with said rotary member, means operating when said last-named member extends eccentrically of said rotary member, to drive said last-named member, yieldable means operating to draw said last-named member to a position concentric with said rotary member, a cutter, pattern-guided means operatively connected with said second-named member for guiding the movements of said cutter and operating to hold said second-named means in eccentric position relative to said rotary member and in opposition to said yielding means when said pattern-guided means engage the pattern, means for controlling the movements of said first-named means and having a shoulder portion, a pin carried by and shiftable on said rotary member and adapted when in one position to engage with said shoulder portion and actuate said last-named means to discontinue the operation of said rotary member, said pin being so positioned as to be engaged by said shiftable member and be shifted into position for engaging said shoulder portion when said shiftable member moves to a position concentric with said rotary member, and a spring for yieldingly holding said pin in a position in which it will not engage with said shoulder portion.

23. In a wood-working machine, the combination of a rotary member, means for rotating said member, a shiftable member cooperating with said rotary member, means operating when said last-named member extends eccentrically of said rotary member, to drive said last-named member, yieldable means operating to draw said last-named member to a position concentric with said rotary member, a cutter, pattern-guided means operatively connected with said second-named member for guiding the movements of said cutter and operating to hold said second-named means in eccentric position relative to said rotary member and in opposition to said yielding means when said pattern-guided means engage the pattern, means for controlling the operation of said first-named means, including a pivoted shaft having a crank-arm, a lever pivotally connected with said crank-arm and having a shoulder portion extending adjacent to said rotary member, a pin carried by and shiftable on said rotary member and adapted when in one position to engage said shoulder portion to actuate said lever and rotate said shaft, said pin being so positioned as to be moved to said position when said shiftable member moves to a position concentric with said rotary member, and means for yieldingly holding said pin in retracted position.

24. In a wood-working machine, the combination of a holder for supporting a pattern and a plurality of pieces of work, a pattern-tracer, a plurality of cutters, means operatively connecting together said tracer and cutters, means for causing said pattern-tracer to move around, and in contact with, a pattern, and tending to move said tracer to a central point, said holder being movable relative to said tracer and cutters for feeding the pattern and work to said tracer and cutters, and means individual to each of said cutters and tracer for adjusting said cutters and tracer toward and away from said holder and to maintain said cutters and tracer in the same horizontal plane.

25. In a wood-working machine, the combination of means for holding a pattern and the material to be cut, means coöperating with the pattern and the material for shaping the material to correspond with the pattern, including a pattern-tracer and cutter, means operatively connecting together said tracer and cutter, and means for causing said tracer to move around, and in contact with, the pattern, said first-named and said second-named means being relatively movable for feeding the pattern and work to said tracer and cutter, a guard for said cutter, and means operating automatically to cause said guard to move to guarding position after said first and second named means are separated a predetermined distance at the conclusion of the cutting operation.

26. In a wood-working machine, the combination of a pattern-tracer, a cutter, means operatively connecting together said tracer and cutter, means for causing said tracer to move around, and in contact with, the pattern, a holder for the pattern and the material to be cut movable toward and away from said tracer and cutter for feeding the pattern and work to said tracer and cutter, a guard device for said cutter, and means operated by said holder in its movement in a direction away from said cutter for causing said guard device to move to guarding position after the cutting operation.

27. In a wood-working machine, the combination of a pattern-tracer, a cutter, means operatively connecting together said tracer and cutter, means for causing said tracer to move around, and in contact with, the pattern, a holder for the pattern and the material to be cut movable toward and away from said tracer and cutter for feeding the pattern and work to said tracer and cutter, a guard device tending normally to swing to a position for guarding the cutter, means for releasably holding said guard out of operative position relative to said cutter, and means operated by said holder in its movement away from said cutter for actuating said last referred to means to release the guard device and thereby permit it to move to guarding position.

28. In a wood-working machine, the combination of a rotary member, means for rotating said member, a shiftable member coöperating with said rotary member, means operating when said last-named member extends eccentrically of said rotary member, to drive said last-named member, yieldable means operating to draw said last-named member to a position concentric with said rotary member, a cutter, pattern-guided means operatively connected with said second named member for guiding the movements of said cutter and operating to hold said second-named member in eccentric position relative to said rotary member and in opposition to said yielding means when said pattern-guided means engage the pattern, and means operating automatically to stop said rotary member in a predetermined position in each successive stopping operation, whereby said pattern-guided means are shiftable in each manual movement for repositioning the latter relative to a pattern by a movement in the same predetermined direction.

29. In a wood-working machine, the combination of a rotary member having a radially disposed guide-way, means for rotating said member, a shiftable member extending into said guide-way and operating when said last-named member extends eccentrically of said rotary member to be driven by said rotary member, means operating to draw said shiftable member to a position concentric with said rotary member, a cutter, pattern-guided means operatively connected with said shiftable member for guiding the movements of said cutter and operating to hold said shiftable member in eccentric position relative to said rotary member and in opposition to said yielding means when said pattern-guided means engage the pattern, and means operating automatically to stop said rotary member in a predetermined position in each successive stopping operation, whereby said guide-way is caused to stop in a predetermined position each time said rotary member is stopped and each manual movement for repositioning said pattern guided means relative to a pattern is in the same predetermined direction.

30. In a wood-working machine, the combination of a rotary member, means for rotating said member, a shiftable member coöperating with said rotary member, means operating when said last-named member extends eccentrically of said rotary member, to drive said last-named member, yieldable means operating to draw said last-named member to a position concentric with said rotary member, a cutter, pattern-guided means operatively connected with said second-named member for guiding the movements of said cutter and operating to hold said second-named member in eccentric position relative to said rotary member and in opposition to said yielding means when said pattern-guided means engage the pattern, and means operating automatically to arrest said rotary-member-driving means and brake said rotary member to cause it to stop in a predetermined position in each successive stopping operation, whereby said pattern-guided means are shiftable in each manual movement for repositioning the latter relative to a pattern by a movement in the same predetermined direction.

ARTHUR B. NORRIS.

In presence of—
 RAYMOND H. ARNOT,
 W. EUGENE WRALLY.